US011363231B2

(12) United States Patent
Kang et al.

(10) Patent No.: US 11,363,231 B2
(45) Date of Patent: Jun. 14, 2022

(54) IMAGE SENSOR

(71) Applicant: SAMSUNG ELECTRONICS CO., LTD., Suwon-si (KR)

(72) Inventors: Sunyool Kang, Suwon-si (KR);
Yunhwan Jung, Hwaseong-si (KR);
Seokyong Hong, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/333,712

(22) Filed: May 28, 2021

(65) Prior Publication Data

US 2022/0078363 A1 Mar. 10, 2022

(30) Foreign Application Priority Data

Sep. 7, 2020 (KR) .......................... 10-2020-0113790

(51) Int. Cl.
*H04N 5/378* (2011.01)
*H04N 5/369* (2011.01)
*H04N 5/376* (2011.01)

(52) U.S. Cl.
CPC ........... *H04N 5/378* (2013.01); *H04N 5/3698* (2013.01); *H04N 5/3765* (2013.01)

(58) Field of Classification Search
CPC ..... H04N 5/3698; H04N 5/3765; H04N 5/378
See application file for complete search history.

(56) References Cited

U.S. PATENT DOCUMENTS

| 9,143,119 | B2 | 9/2015 | Sohn |
| 9,843,297 | B2 | 12/2017 | Smith et al. |
| 9,894,309 | B2* | 2/2018 | Yun ........................ H04N 5/378 |
| 10,257,452 | B2 | 4/2019 | Sakakibara et al. |
| 2009/0128676 | A1* | 5/2009 | Tanaka ............... H04N 5/37457 348/340 |
| 2009/0167915 | A1 | 7/2009 | Hirota et al. |
| 2018/0091752 | A1* | 3/2018 | Ebihara ................ H03K 5/2481 |
| 2019/0116331 | A1 | 4/2019 | Jung et al. |
| 2020/0077039 | A1 | 3/2020 | Zimmerman et al. |

FOREIGN PATENT DOCUMENTS

EP    1 207 624 B1    5/2002

* cited by examiner

*Primary Examiner* — Lin Ye
*Assistant Examiner* — Chriss S Yoder, III
(74) *Attorney, Agent, or Firm* — Sughrue Mion, PLLC

(57) ABSTRACT

An image sensor includes a pixel array including a plurality of pixels connected to row lines extending in a first direction and to column lines extending in a second direction intersecting the first direction, a ramp voltage generator configured to output a ramp voltage, a plurality of comparators, each of the plurality of comparators including a first input terminal to which the ramp voltage is input, and a second input terminal connected to one of the column lines, and a replica circuit having a same structure as a structure of a portion of the comparators. Each of the comparators includes a plurality of transistors, a first auto-zero transistor connected to the first input terminal, a second auto-zero transistor connected to the second input terminal, and wirings connected to the plurality of transistors, the first auto-zero transistor, and the second auto-zero transistor.

20 Claims, 23 Drawing Sheets

IMAGE SENSOR

CROSS-REFERENCE TO RELATED APPLICATION

This application is based on and claims priority under 35 U.S.C. § 119 to Korean Patent Application No. 10-2020-0113790 filed on Sep. 7, 2020, in the Korean Intellectual Property Office, the disclosure of which is incorporated by reference herein in its entirety.

BACKGROUND

The disclosure relates to an image sensor.

An image sensor is a semiconductor-based sensor generating an electrical signal in response to external light, and may include a pixel array having a plurality of pixels, and a logic circuit for driving the pixel array and generating an image. The logic circuit may include a plurality of comparators for receiving the electrical signal and converting the electrical signal into a digital signal. However, there may been an issue in which a comparator included in the image sensor may not be sufficiently utilized due to distribution of a process result value and the temperature of a semiconductor chip in which an image sensor is integrated. Thus, it may be necessary to improve an input range of a comparator.

SUMMARY

Provided is an image sensor having an improved input range of a comparator, by transferring information acquired using a replica circuit to a ramp voltage generator.

According to example embodiments, an image sensor includes a pixel array including a plurality of pixels connected to row lines extending in a first direction and to column lines extending in a second direction intersecting the first direction, a ramp voltage generator configured to output a ramp voltage, a plurality of comparators, each of the plurality of comparators including a first input terminal to which the ramp voltage is input, and a second input terminal connected to one of the column lines, and a replica circuit having a same structure as a structure of a portion of the comparators. Each of the comparators includes a plurality of transistors, a first auto-zero transistor connected to the first input terminal, a second auto-zero transistor connected to the second input terminal, and wirings connected to the plurality of transistors, the first auto-zero transistor, and the second auto-zero transistor. A gate terminal of the first auto-zero transistor is connected to a first wiring among the wirings. A gate terminal of the second auto-zero transistor is connected to a second wiring different from the first wiring, among the wirings.

According to example embodiments, an image sensor includes a pixel array including a plurality of pixels, a plurality of comparators, each of the plurality of comparators including a first input terminal, a second input terminal, a first auto-zero switch connected to the first input terminal, and a second auto-zero switch connected to the second input terminal, a replica circuit including same devices as a portion of devices included in each of the plurality of comparators, and configured to output a sensing signal corresponding to an auto-zero voltage and a common node voltage of each of the plurality of comparators, and a ramp voltage generator configured to compensate a ramp voltage based on the output sensing signal, and output the compensated ramp voltage to the first input terminal of each of the plurality of comparators. The sensing signal corresponds to a threshold voltage of an input transistor connected to the first input terminal of each of the plurality of comparators. Each of the plurality of comparators is configured to generate an output signal by comparing a pixel voltage and a reset voltage that are output from the pixel array, with the output ramp voltage.

According to example embodiments, an image sensor includes a pixel array including a plurality of pixels, a ramp voltage generator configured to output a ramp voltage, a plurality of comparators configured to generate an output signal by comparing a reset voltage and a pixel voltage that are output by the pixel array, with the output ramp voltage, and a sensing circuit configured to sense threshold voltages of input transistors included in the plurality of comparators, and output, to the ramp voltage generator, a control signal for compensating the ramp voltage. The ramp voltage is compensated based on the output control signal.

BRIEF DESCRIPTION OF DRAWINGS

The above and other aspects, features, and advantages of embodiments of the disclosure will be more apparent from the following description taken in conjunction with the accompanying drawings, in which.

DETAILED DESCRIPTION

Hereinafter, embodiments of the disclosure will be described as follows with reference to the accompanying drawings.

Figure 1:
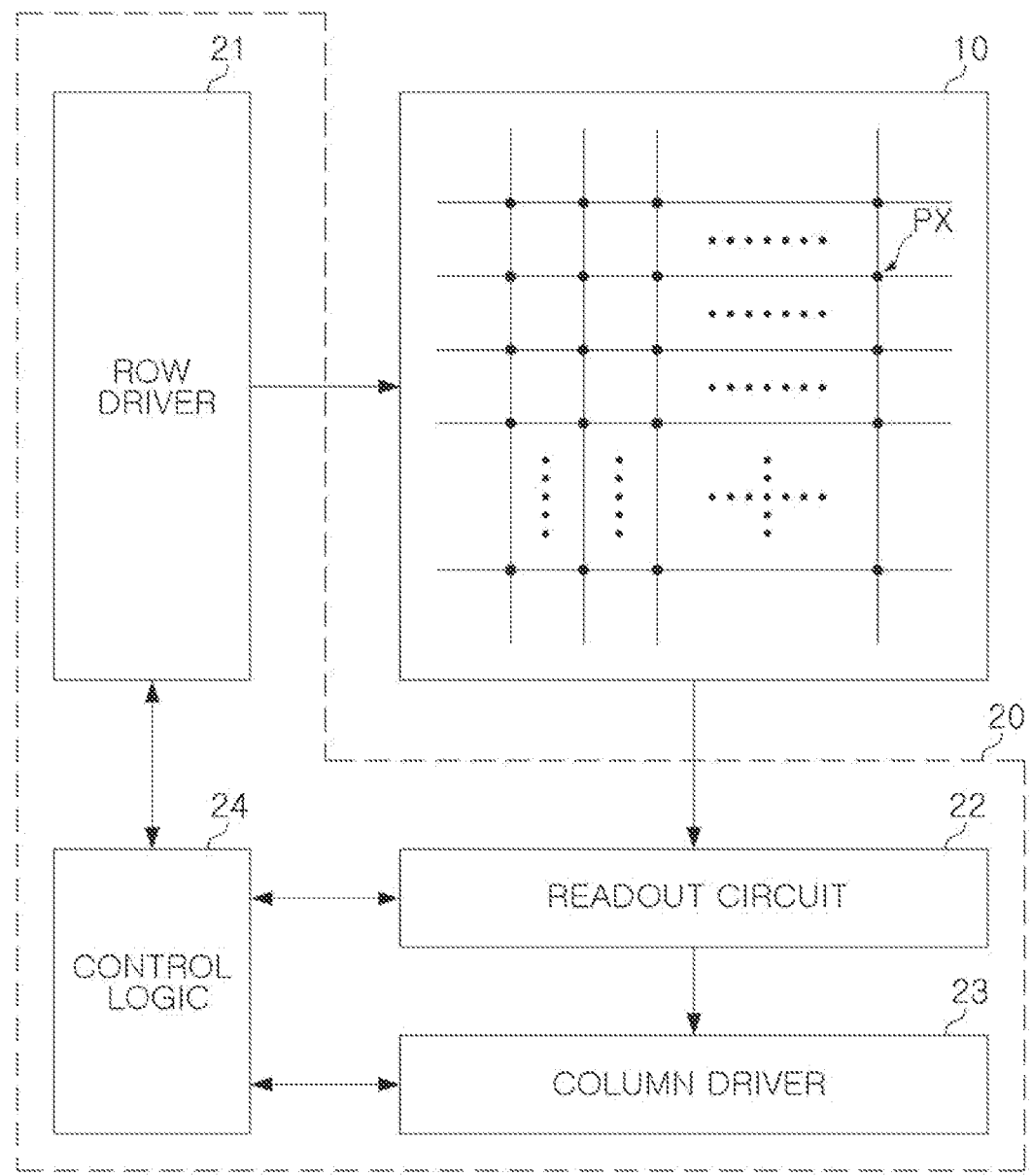
FIG. 1 is a block diagram illustrating an image sensor according to example embodiments.

FIG. 1 is a block diagram illustrating an image sensor according to example embodiments.

Referring to FIG. 1, an image sensor 1 according to example embodiments may include a pixel array 10 and a controller 20, and the controller 20 may include a row driver 21, a readout circuit 22, a column driver 23, and a control logic 24.

The image sensor 1 may generate image data by converting light received from the outside into an electrical signal. The pixel array 10 included in the image sensor 1 may include a plurality of connected pixels PX connected to a plurality of row lines extending in a first direction and a plurality of column lines extending in a second direction intersecting the first direction. The plurality of pixels PX may include a photoelectric conversion element, such as a photodiode PD, generating an electric charge in response to an optical signal incident from the outside.

Each of the plurality of pixels PX may include a pixel circuit for generating a pixel signal from electric charges generated by photodiodes. For example, the pixel circuit may include a transfer transistor, a drive transistor, a select transistor, a reset transistor, and a floating diffusion.

The pixel circuit may output a reset voltage and a pixel voltage. The pixel voltage may correspond to electric charges generated by the photodiodes included in each of the plurality of pixels PX and stored in the floating diffusion. In an example embodiment, two or more pixels PX adjacent to each other may form a single pixel group, and two or more pixels PX included in the pixel group may share at least a portion of a transfer transistor, a driving transistor, a select transistor, and a reset transistor.

The row driver 21 may drive the pixel array 10 by inputting a driving signal to the plurality of row lines. For example, the driving signal may include a transmission control signal for controlling the transfer transistor of the pixel circuit, a reset control signal for controlling the reset transistor, a select control signal for controlling the selection transistor.

The readout circuit 22 may include a plurality of comparators, and a counter circuit for converting an output of each of the comparators into digital signals. The readout circuit 22 may include a ramp voltage generator for generating a ramp voltage to be compared with a reset voltage and a pixel voltage, input from the pixel array 10.

The column driver 23 may include a latch and an amplifier circuit for temporarily storing a digital signal, and may process a digital signal received from the readout circuit 22. The row driver 21, the readout circuit 22, and the column driver 23 may be controlled by the control logic 24.

The control logic 24 may include a timing controller for controlling the operation timing of the row driver 21, the readout circuit 22 and the column driver 23, and an image signal processor for processing image data. In example embodiments, the image signal processor may be included in an external processor connected to be able to communicate with the image sensor 1.

Figure 2:
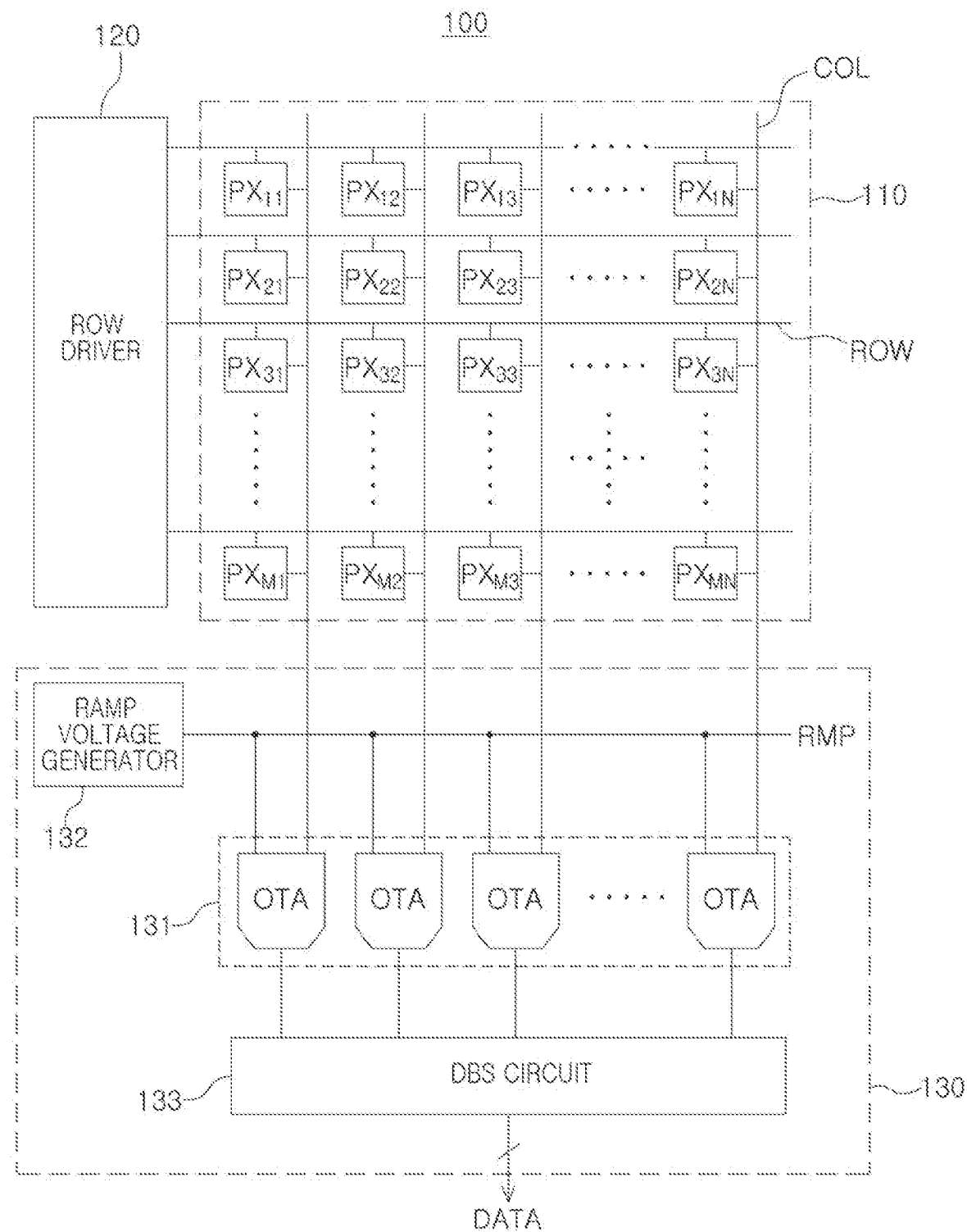
FIG. 2 is a block diagram illustrating a pixel array and a readout circuit in an image sensor according to example embodiments.

FIG. 2 is a block diagram illustrating a pixel array and a readout circuit in an image sensor according to example embodiments.

Referring to FIG. 2, an image sensor 100 according to example embodiments may include a pixel array 110, and a controller for driving the pixel array 110. The controller may include a row driver 120 and a readout circuit 130. The readout circuit 130 may include a plurality of comparators 131, a ramp voltage generator 132, and a data-bus (DBS) circuit 133. However, an example embodiment thereof is not limited thereto, and the readout circuit 130 may further include other elements as necessary.

The pixel array 110 of the image sensor according to example embodiments may include a plurality of pixels $PX_{11}$-$PX_{MN}$ arranged at points at which the plurality of row lines ROW and the plurality of column lines COL intersect each other. The row driver 120 may input a signal to control the plurality of pixels $PX_{11}$-$PX_{MN}$ through the plurality of row lines ROW. In an example embodiment, the image sensor may operate by a rolling shutter method for sequentially exposing the pixels $PX_{11}$-$PX_{MN}$ connected to the row lines to light, or a global shutter method for simultaneously exposing the pixels $PX_{11}$-$PX_{MN}$ to light.

The row driver 120 may select one of the plurality of row lines ROW during a predetermined horizontal period. For example, the time to drive a select driving line among the plurality of row lines and to read the reset voltage and the pixel voltage from the pixels $PX_{11}$-$PX_{MN}$ connected to the select driving line may be defined as one horizontal period.

The frame period of the image sensor may be defined as times to read the reset voltage and the pixel voltage from all the pixels $PX_{11}$-$PX_{MN}$ included in the pixel array 110. For example, the frame period may be equal to or greater than a product of the number of the plurality of row lines and the horizontal period. As the frame period of the image sensor is shorter, the image sensor may generate a greater number of image frames during the same time period.

A plurality of comparators 131 included in the image sensor 100 according to example embodiments may each include an amplifier. The amplifier included in each of the plurality of comparators 131 may be an operational transconductance amplifier (OTA).

The comparators 131 may be connected to the pixels $PX_{11}$-$PX_{MN}$ through column lines. For example, the comparators 131 may obtain a reset voltage and a pixel voltage from selected pixels connected to a row line selected by the row driver 120, of the plurality of pixels $PX_{11}$-$PX_{MN}$.

In an example embodiment, the comparators 131 may be samplers, and may be correlated double samplers (Correlated Double Sampler, CDS). Each of the comparators 131 may include a first input terminal connected to one of the column lines COL, and a second input terminal receiving a ramp voltage output by the ramp voltage generator 132. A reset voltage and a pixel voltage output by the pixels $PX_{11}$-$PX_{MN}$ may be input to the first input terminal. The comparators 131 may perform correlated double sampling, may compare each of the reset voltage and the pixel voltage with the ramp voltage, and may output a result thereof.

The DBS circuit 133 may convert a result of comparison output by the comparators 131 into digital data DATA, and may output the data. The DBS circuit 133 may include a counter circuit. The DBS circuit 133 may be implemented as an analog-to-digital converter along with other components.

The ramp voltage generator 132 may include a current cell array including unit current cells for generating a ramp voltage input to the second input terminals of the comparators 131. The lamp voltage generator 132 may generate a lamp voltage through sequential operations of turning on and turning off of unit current cells. A magnitude of the lamp voltage may be determined on the basis of the number of unit current cells actually operating in the lamp voltage generator 132. For example, the number of unit current cells included in the ramp voltage generator 132 may be determined according to the number of bits of digital data DATA. As an example, when the digital data DATA is 10-bit data, the ramp voltage generator 132 may include 1024 or more unit current cells.

Figure 3:
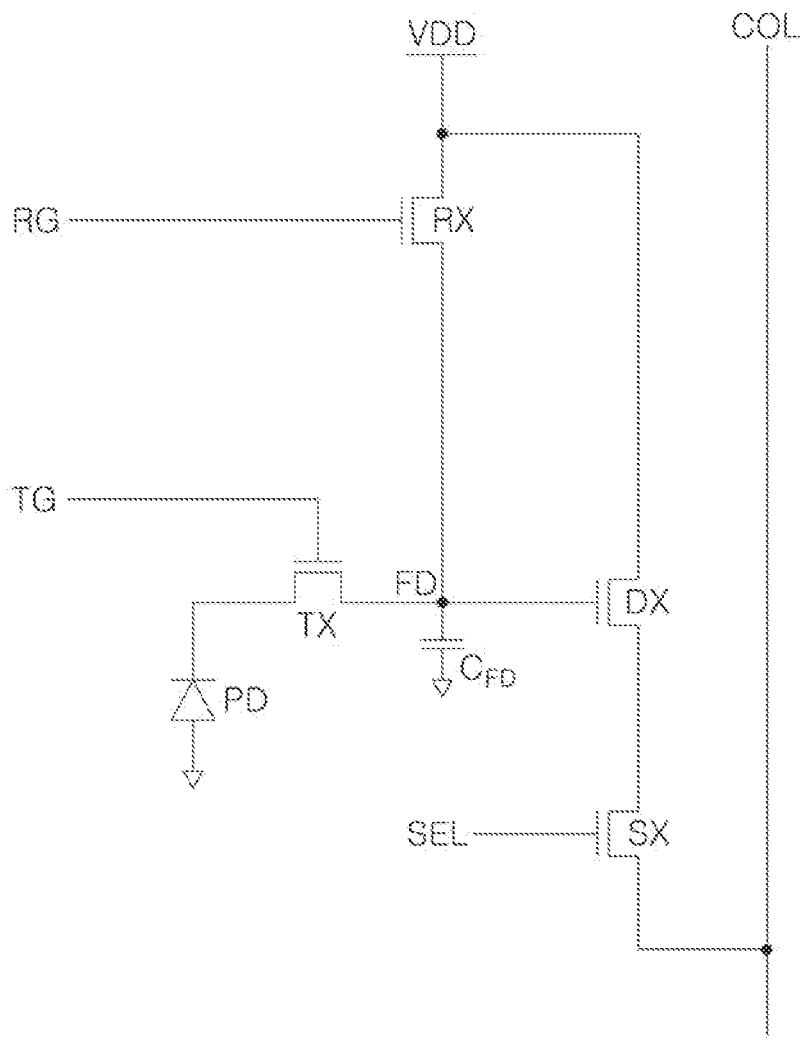
FIGS. 3 and 4 are circuit diagrams illustrating a pixel included in a pixel array in an image sensor according to example embodiments.
Figure 4:
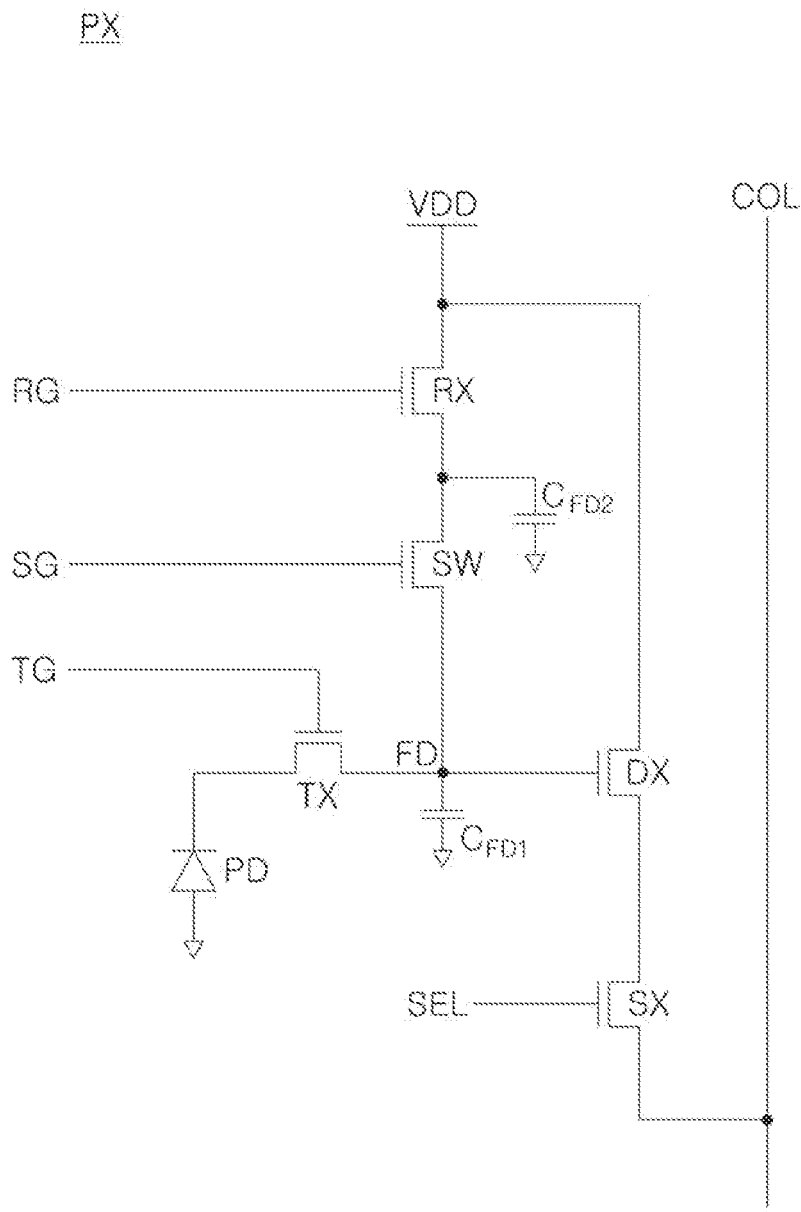

FIGS. 3 and 4 are circuit diagrams illustrating a pixel included in a pixel array in an image sensor according to example embodiments.

Referring to FIG. 3, a pixel included in an image sensor according to example embodiments may include a photodiode PD for generating an electric charge in response to light and a pixel circuit PX for processing an electric charge generated by the photodiode PD and outputting an electrical signal. For example, the pixel circuit PX may include a floating diffusion FD, a reset transistor RX, a driving transistor DX, a select transistor SX, and a transfer transistor TX.

The reset transistor RX may be connected between a power node for supplying the power voltage VDD and the floating diffusion FD and may be controlled by a reset control signal RG. For example, when the reset transistor RX is turned on, a voltage of the floating diffusion FD may be reset to the power voltage VDD. When a voltage of the floating diffusion FD is reset, the select transistor SX may be turned on by the select control signal SEL and may output the reset voltage to the column line COL.

In an example embodiment, the photodiode PD may generate electrons or holes as main charge carriers in response to light. When the reset voltage is output to the column line COL and the transfer transistor TX is turned on by the transfer control signal TG, an electric charge generated by the photodiode PD exposed to light may move to a capacitor $C_{FD}$ of the floating diffusion FD. The driving transistor DX may operate as a source-follower amplifier for amplifying a voltage of the floating diffusion FD. When the select transistor SX is turned on by the select control signal SEL, a pixel voltage based on an electric charge generated by the photodiode PD may be output to the column line COL.

Each of the reset voltage and the pixel voltage may be detected by a readout circuit connected to the column line COL. The readout circuit may include a plurality of comparators having a first input terminal and a second input terminal, and the comparator may receive a ramp voltage through the first input terminal. The comparator may compare a ramp voltage input to the first input terminal with a reset voltage and a pixel voltage input to the second input terminal.

A DBS circuit may be connected to the output terminal of the comparator, and the DBS circuit may output reset data corresponding to a result of comparing the lamp voltage with the reset voltage, and pixel data corresponding to a result of comparing the lamp voltage with the pixel voltage. The controller may generate image data using a pixel signal corresponding to a difference between the reset data and the pixel data.

A magnitude of the pixel voltage may be determined by the amount of electric charge generated by the photodiode PD and transferred to the floating diffusion FD, and a conversion gain of the pixel circuit PX. The conversion gain of the pixel circuit PX may correspond to a voltage change caused by electric charges and may be in inverse proportion to capacitance of the floating diffusion FD. In other words, when the capacitance of the floating diffusion FD increases, a conversion gain of the pixel circuit PX may decrease, and when the capacitance of the floating diffusion FD decreases, a conversion gain of the pixel circuit PX may increase.

A conversion gain may affect performance of the image sensor. For example, when the conversion gain of the pixel circuit PX is set to correspond to a low-illuminance environment, an image signal generated in a high-illuminance environment may exceed a dynamic range of the image sensor, and accordingly, quality of the image may be deteriorated. When the conversion gain of the pixel circuit PX is set to correspond to a high-illuminance environment, the driving transistor DX may not be sufficiently driven in the low-illuminance environment, and accordingly, quality of the image may be deteriorated.

Referring to FIG. 4, in the image sensor according to example embodiments, the pixel circuit RX may further include a switch device SW connected between the reset transistor RX and the floating diffusion FD to address the issue described above. The turning switch device SW on and off may be controlled by the switch control signal SG.

The image sensor according to example embodiments may turn the switch device SW on or off to dynamically adjust a conversion gain of the pixel circuit PX. Also, the image sensor may determine whether to turn the switch device SW on or off in consideration of a length of the exposure time for which the photodiode PD is exposed to light to obtain a pixel signal, and may generate a single result image using the pixel signals obtained from different exposure time periods. Accordingly, noise properties and a dynamic range of the image sensor may be improved.

As an example, when the switch device SW is turned off, capacitance of the floating diffusion FD that stores charge charges generated by the photodiode PD may be determined as first capacitance $C_{FD1}$. When the switch device SW is turned on, the capacitance of the floating diffusion FD may be determined to be a sum of the first capacitance $C_{FD1}$ and the second capacitance $C_{FD2}$. In other words, by turning the switch device SW off, the capacitance of the floating diffusion FD may be reduced and the conversion gain may be increased, and by turning the switch device SW on, the capacitance of the floating diffusion FD may increase and the conversion gain may be reduced. For example, the switch device SW may be turned off when the amount of light is relatively small, and may be turned on when the amount of light is relatively large.

Figure 5:
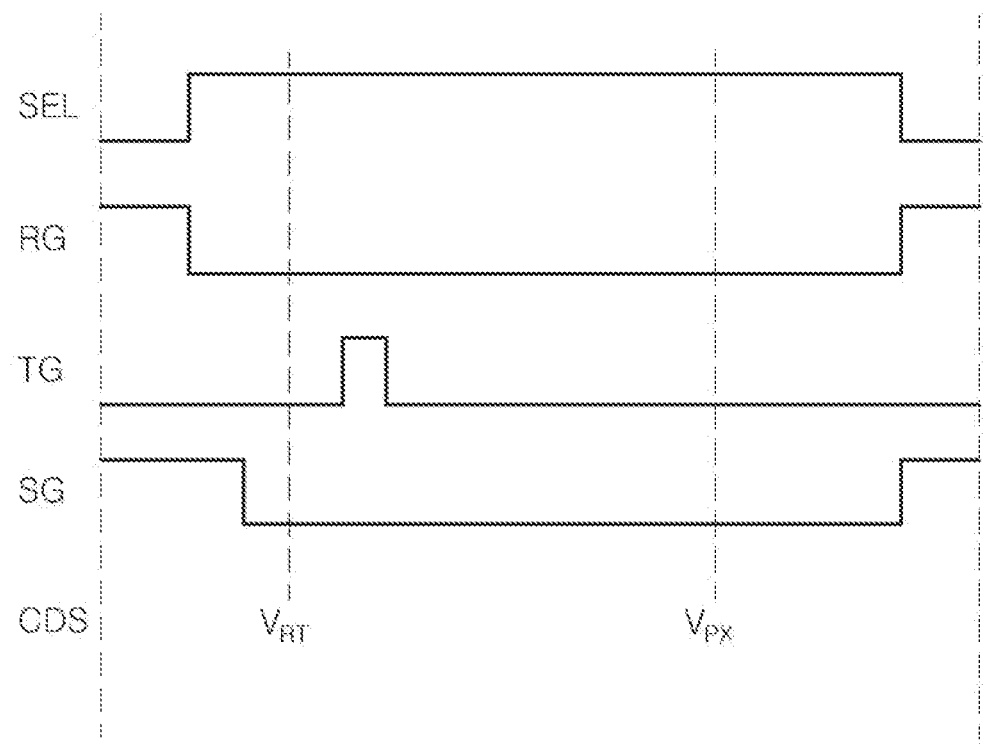
FIG. 5 is a diagram illustrating a correlated double sampling operation of an image sensor according to example embodiments.

FIG. 5 is a diagram illustrating a correlated double sampling operation of an image sensor according to example embodiments.

Referring to FIGS. 4 and 5, the reset transistor RX may be turned on by a reset control signal RG, such that a voltage of the floating diffusion FD may be reset. In this case, the switch device SW may be turned on by the switch control signal SG along with the reset transistor RX, such that the voltage of the floating diffusion FD may be reset.

When the voltage of the floating diffusion FD is reset, the reset transistor RX and the switch device SW may be turned off, and the comparator CDS of the readout circuit may read out the reset voltage $V_{RT}$ from the pixel by the selection control signal SEL. When the reset voltage $V_{RT}$ is read, the transfer transistor TX may be turned on by the transfer control signal TG, and electric charges of the photodiode PD may move to the floating diffusion FD.

As an example, after the reset voltage $V_{RT}$ is read out, while the transfer transistor TX is turned on and electric charges of the photodiode PD moves to the floating diffusion FD, the switch device SW may maintain a turned off state. Accordingly, the capacitance of the floating diffusion FD may be determined to be the first capacitance $C_{FD1}$, and the conversion gain of the pixel may be determined to be a first value corresponding to the first capacitance $C_{FD1}$. In other words, when the conversion gain of the pixel has the first value, the image sensor may move the electric charges of the photodiode PD to the floating diffusion FD and may read out the pixel voltage $V_{PX}$.

The comparator CDS in which a correlated double sampling operation is performed may read out a reset voltage $V_{RT}$ and a pixel voltage $V_{PX}$ during a single horizontal period, and a controller of the image sensor may obtain a pixel signal corresponding to a difference between the reset voltage $V_{RT}$ and the pixel voltage $V_{PX}$.

In example embodiments, a turn-on timing of the switch device SW may be varied. For example, after a single horizontal cycle, the image sensor may turn on the switch device SW. When the switch device SW is turned on, the capacitance of the floating diffusion FD may be determined to be a sum of the first capacitance $C_{FD1}$ and the second capacitance $C_{FD2}$, and accordingly, the conversion gain of the pixel may have a second value corresponding to the sum of the first capacitance $C_{FD1}$ and the second capacitance $C_{FD2}$. The second value may be smaller than the first value.

When the conversion gain of the pixel has the second value, the comparator CDS may obtain the reset voltage $V_{RT}$ and the pixel voltage $V_{PX}$ by a similar process. Likewise, the controller of the image sensor may obtain a new pixel signal during a new horizontal period. The image sensor may generate an image frame using sequentially acquired pixel signals.

Figure 6:
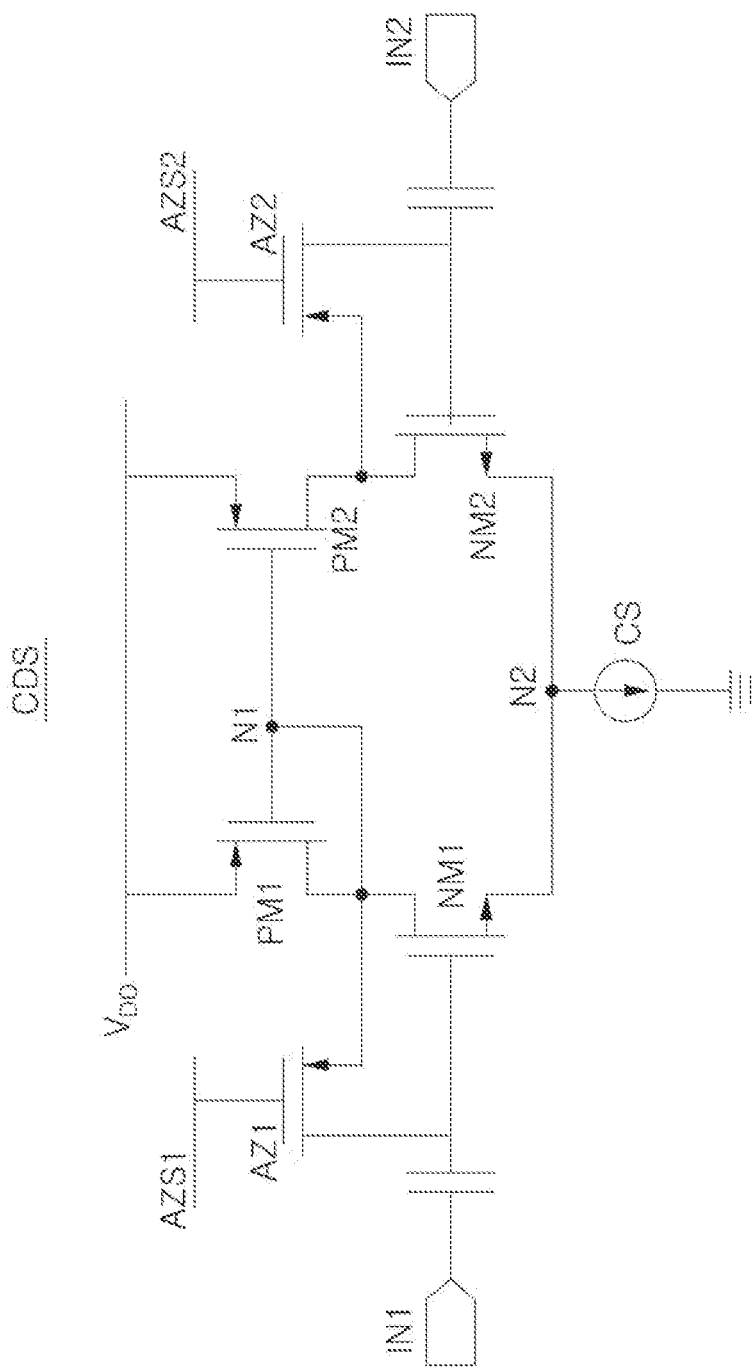
FIG. 6 is a circuit diagram illustrating a comparator included in an image sensor according to example embodiments.

FIG. 6 is a circuit diagram illustrating a comparator included in an image sensor according to example embodiments.

Referring to FIG. 6, in an example embodiment, the comparator may be a correlated double comparator (CDS), and may include a plurality of transistors. The comparator CDS may include a first PMOS transistor PM1, a second PMOS transistor PM2, a first NMOS transistor NM1, and a second NMOS transistor NM2. However, the configuration of the comparator CDS and the number of transistors may be varied in example embodiments.

The first PMOS transistor PM1 and the second PMOS transistor PM2 may be connected to a power node for supplying a power voltage VDD, and the first NMOS transistor NM1 and the second NMOS transistor NM2 may be connected to a current source CS for supplying a bias current.

A gate of the first NMOS transistor NM1 may provide the first input terminal IN1 of the comparator CDS, and a gate of the second NMOS transistor NM2 may provide a second input terminal IN2 of the comparator CDS. In an example embodiment, the first input terminal IN1 may be connected to an output terminal of a lamp voltage generator for generating a lamp voltage, and the second input terminal IN2 may be connected to pixels of the image sensor through a column line.

The first PMOS transistor PM1, the second PMOS transistor PM2, the first NMOS transistor NM1, and the second NMOS transistor NM2 may provide an amplifier circuit. In an example embodiment, the amplifier circuit may be implemented as an OTA circuit. In an example embodiment, the first PMOS transistor PM1 and the second PMOS transistor PM2 may have the same size, and the first NMOS transistor NM1 and the second NMOS transistor NM2 may have the same size. The first and second PMOS transistors PM1 and PM2 and the first and second NMOS transistors NM1 and NM2 may have the same size or different sizes.

In the image sensor according to example embodiments, the comparator CDS may include a first auto-zero switch AZ1 connected to the first input terminal IN1 and a second auto-zero switch AZ2 connected to the second input terminal IN2. The first and second auto-zero switches AZ1 and AZ2 may be used to control the auto-zero operation of the image sensor. The first and second auto-zero switches AZ1 and AZ2 may be implemented as transistors, and may receive different control signals through respective gate terminals. Accordingly, the operations of turning on and off the first auto-zero switch AZ1 and the second auto-zero switch AZ2 may be controlled independently.

In the image sensor according to example embodiments, a plurality of transistors included in the comparator CDS may be connected to each other through a plurality of wirings. For example, a gate terminal of the first auto-zero switch AZ1 may be connected to a first wiring, and a gate terminal of the second auto-zero switch AZ2 may be connected to a second wiring. The first wiring and the second wiring may transmit different signals, the first auto-zero signal AZS1 may be transmitted through the first wiring, and the second auto-zero signal AZS2 may be transmitted through the second wiring. The first wiring and the second wiring may be physically separated from each other.

The turning on-off timing of the first and second auto-zero switches AZ1 and AZ2 in the auto-zero operation may be controlled differently from each other by the first auto-zero signal AZS1 and the second auto-zero signal AZS2. For example, in the image sensor according to example embodiments, after the first auto-zero switch AZ1 included in each comparator CDS is turned off during the auto-zero operation, the second auto-zero switch AZ2 may be turned off. In other words, while the second auto-zero switch AZ2 maintains the turned-on state, only the first auto-zero switch AZ1 may be turned off.

Also, while one of the first auto-zero switch AZ1 and the second auto-zero switch AZ2 maintains the turned-off state, only the other may be selectively turned on. As an example, the first auto-zero switch AZ1 may be turned on before the second auto-zero switch AZ2, or the second auto-zero switch AZ2 may be turned on before the first auto-zero switch AZ1. Alternatively, in example embodiments, the first auto-zero switch AZ1 and the second auto-zero switch AZ2 may be simultaneously turned on.

In the image sensor according to example embodiments, a node to which the first and second NMOS transistors NM1 and NM2 are connected may be defined as a common node N2, and a voltage applied to the common node N2 may be defined as a common node voltage. Also, a node to which the first and second PMOS transistors PM1 and PM2 are connected may be defined as an auto-zero node N1, and a voltage applied to the auto-zero node N1 may be defined as an auto-zero voltage.

In the image sensor according to example embodiments, the first auto-zero switch AZ1 may be connected to the auto-zero node N1, and the second auto-zero switch AZ2 may be connected to an output terminal of the comparator CDS.

The configuration of the comparator CDS included in the image sensor according to example embodiments is not limited to the above-described example embodiments, and may further include other elements as necessary. For example, an output transistor providing an output terminal, an additional current source supplying an additional bias current, and a MOS capacitor for limiting a bandwidth of an output signal may be further included.

Figure 7:
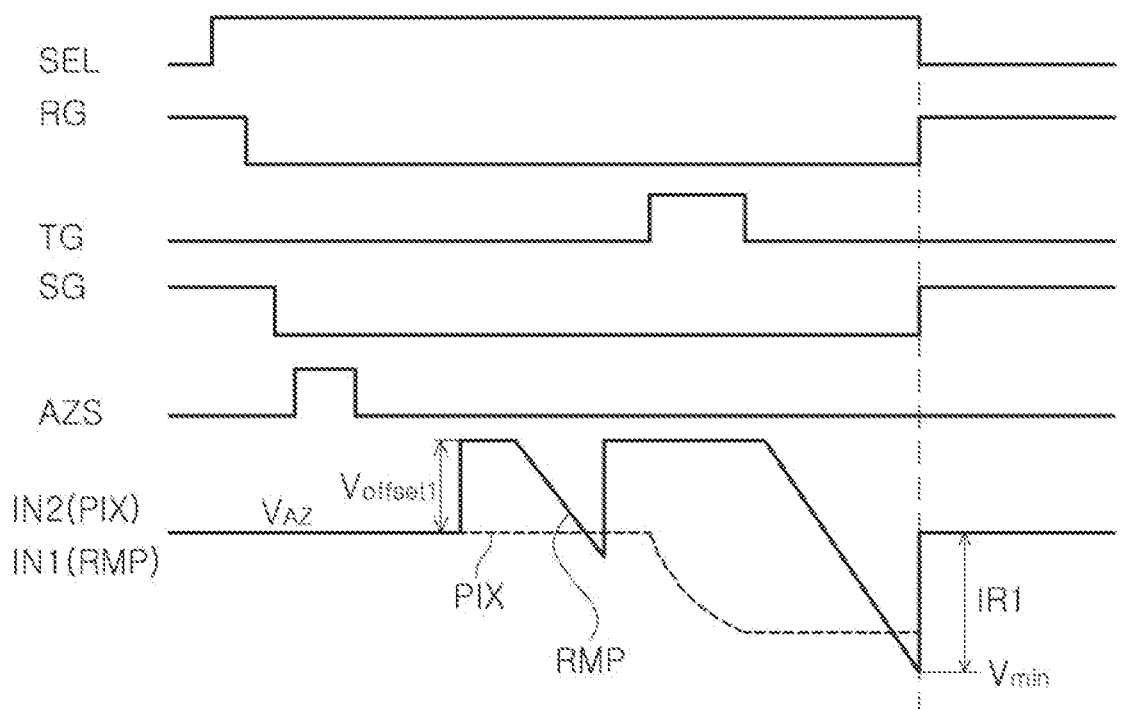
FIGS. 7 and 8 are diagrams illustrating an operation of an image sensor according to example embodiments.
Figure 8:
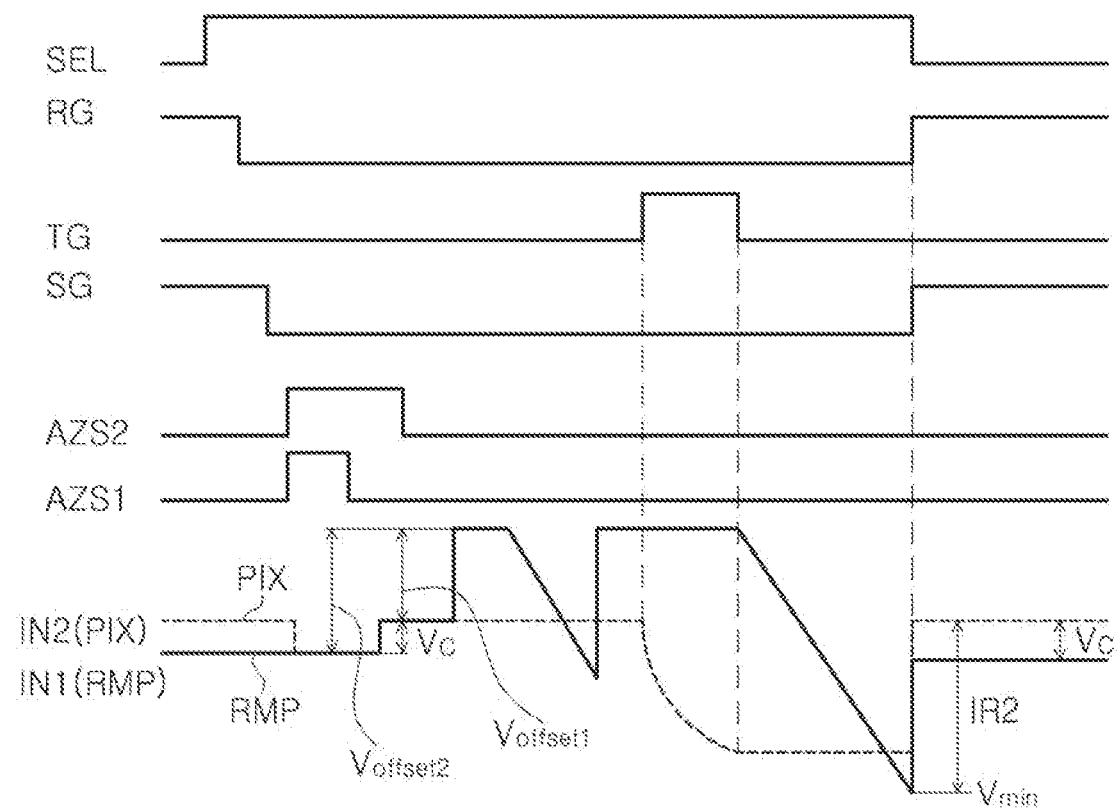

FIGS. 7 and 8 are diagrams illustrating an operation of an image sensor according to example embodiments.

FIG. 7 illustrates an example embodiment of controlling a first auto-zero switch and a second auto-zero switch with a single auto-zero signal AZS in the comparator included in the image sensor according to example embodiments. Referring to FIG. 7, when the first auto-zero switch and the second auto-zero switch are controlled with a single auto-zero signal AZS, the pixel voltage able to be input to the comparator may be limited to the first input range IR1.

According to example embodiments illustrated in FIG. 7, the first auto-zero switch and the second auto-zero switch may be simultaneously turned on by the auto-zero signal AZS, and the comparator may be initialized. As the comparator is initialized, voltage levels of input nodes and/or output nodes of the comparator may be equal to the auto-zero voltage $V_{AZ}$. For an operation of reading out the reset voltage, a first offset voltage $V_{offset1}$ may be added to the ramp voltage RMP, and the ramp voltage RMP may decrease after the selection control signal SEL is activated. Once the readout operation of the reset voltage is completed, a predetermined offset voltage may be added to the ramp voltage RMP again.

The pixel voltage PIX may be maintained to be the reset voltage until the transmission control signal TG is activated. Once the transfer control signal TG is activated and electric charges accumulated in the photodiode move to the floating diffusion, the pixel voltage PIX may decrease as illustrated in FIG. 7.

For the operation of reading out the image signal, the ramp voltage RMP may decrease again. After the operation of reading out the image signal is completed, as the reset control signal RG is activated, the pixel voltage PIX may return to an initial level. In the operation described with reference to FIG. 7, the first input range IR1 corresponding to a difference between the minimum value $V_{min}$ of the ramp voltage RMP and the initial level of the pixel voltage PIX may become the input range of the comparator.

The readout operation of the image sensor according to example embodiments may include a count operation of detecting a time in which the ramp voltage RMP is greater than the pixel voltage PIX. For example, the count operation may be performed by a DBS circuit, and may be implemented in various manners, such as by bit-conversion and up-counting.

In an example embodiment, by controlling the first auto-zero switch included in the comparator by the first auto-zero signal AZS1, and controlling the second auto-zero switch by the second auto-zero signal AZS2, the input range of the comparator may increase.

Referring to FIGS. 6 and 8, the first auto-zero signal AZS1 may be input to the first auto-zero switch AZ1 by a first wiring, and the second auto-zero signal AZS2 may be input to the second auto-zero switch AZ2 by a second wiring. As an example, the first auto-zero signal AZS1 may be deactivated before the second auto-zero signal AZS2, and the first auto-zero switch AZ1 may be turned off prior to the second auto-zero switch AZ2.

By controlling the turning on-off timing of the first auto-zero switch AZ1 and the second auto-zero switch AZ2 differently, the lamp voltage RMP may have an initial value greater than an initial value of the lamp voltage RMP illustrated in FIG. 7. For example, in a state in which the first auto-zero signal AZS1 is deactivated and the second auto-zero signal AZS2 is activated, the compensation voltage $V_c$ may be added to the ramp voltage RMP. Because a compensation voltage $V_c$ may be simultaneously applied in the two input terminals of the comparator by the turning on-off state of the first auto-zero switch AZ1 and the second auto-zero switch AZ2, the pixel voltage PIX may increase as much as the compensation voltage $V_c$ similarly to the the ramp voltage RMP.

According to example embodiments illustrated in FIG. 8, similarly to the example embodiment illustrated in FIG. 7, the first offset voltage $V_{offset1}$ may be added to the ramp voltage RMP for an operation of reading out the reset voltage. In other words, a second offset voltage $V_{offset2}$, a sum of the first offset voltage $V_{offset1}$ and the compensation voltage $V_c$, may be added for the operation of reading out the reset voltage. Accordingly, after the comparison operation is terminated, the pixel voltage PIX may have a value greater than that of the ramp voltage RMP by the compensation voltage $V_c$.

In the operation described with reference to FIG. 8, the second input range IR2 corresponding to the difference between the minimum value $V_{min}$ of the ramp voltage RMP and the initial level of the pixel voltage PIX may be an input range of the comparator. The second input range IR2 may have a value greater by the compensation voltage $V_c$ than the first input range IR1 described with reference to FIG. 7.

As an example, referring to FIG. 6, the compensation voltage $V_c$ may be a voltage corresponding to the threshold voltage of the first NMOS transistor NM1 of the comparator CDS. The compensation voltage $V_c$ may be a value between 50 mV and 700 mV. However, an example embodiment thereof is not limited thereto, and the compensation voltage $V_c$ may be a value of 700 mV or greater. Also, the compensation voltage $V_c$ may be a voltage corresponding to the sum of the threshold voltage and a margin voltage for the image sensor. The margin voltage may be determined on the basis of distribution of the threshold voltage.

For example, the input range of the comparator CDS may be increased by about 50% from the first input range IR1 to the second input range IR2 by the compensation voltage $V_c$. In other words, the second input range IR2 may be about 1.5 times the first input range IR1. However, an example embodiment thereof is not limited thereto, and the second input range IR2 may be between 1 to 1.5 times the first input range IR1 or may be greater than 1.5 times the first input range IR1.

The image sensor according to example embodiments may increase the input range of the comparator by compensating for the ramp voltage RMP generated by the ramp voltage generator as described above. However, because the threshold voltage of the first NMOS transistor NM1 may vary according to distribution and temperature of a process result value, the compensation voltage $V_c$ may vary depending on an environment. Therefore, it may be necessary to sense the compensation voltage $V_c$ and to input the votlage to the ramp voltage generator in the form of a control signal.

In the description below, a method of inputting a control signal to a lamp voltage generator using a replica circuit or a test circuit and a method of operating the lamp voltage generator will be described with reference to FIGS. 9 to 14.

Figure 9:
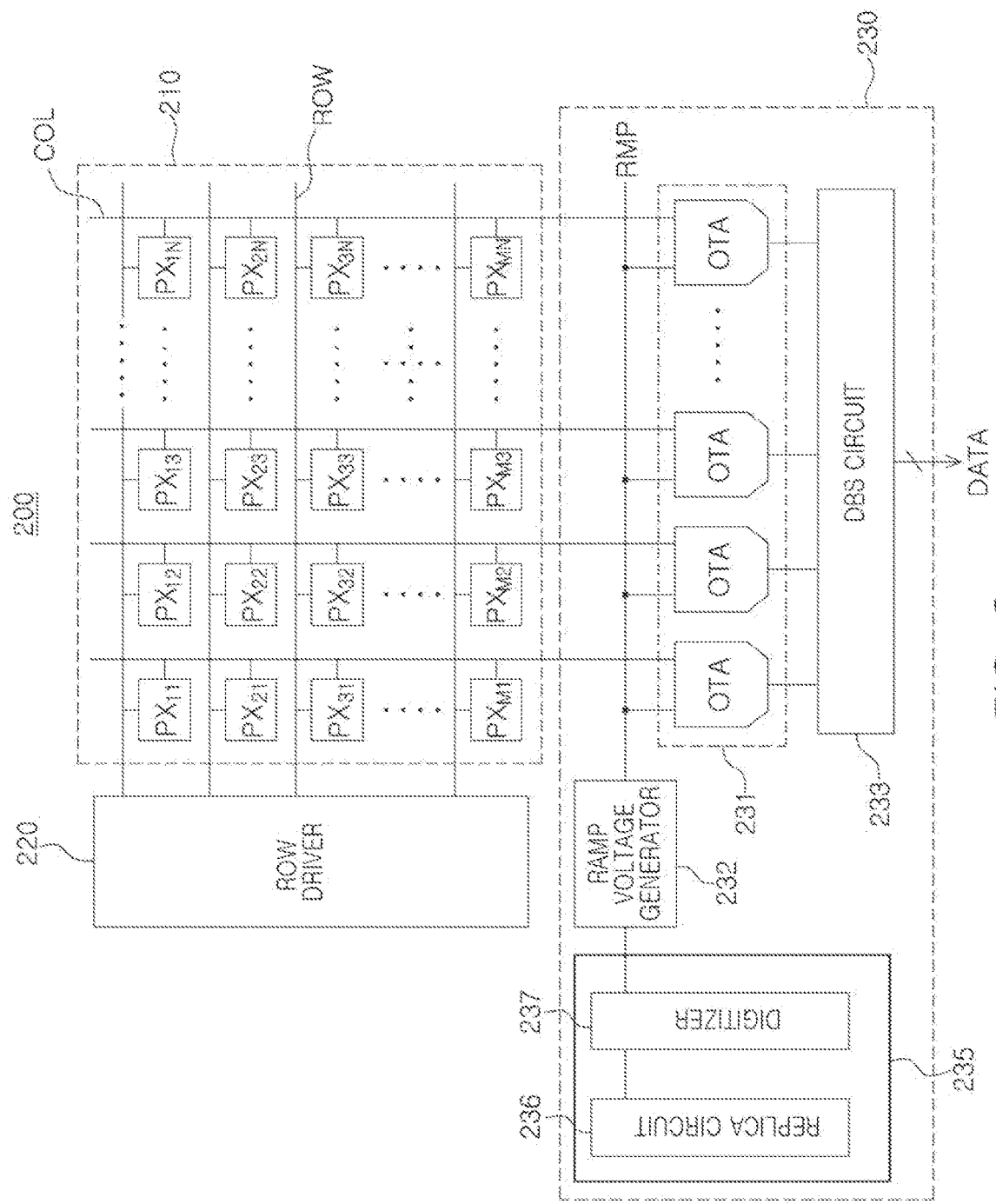
FIG. 9 is a block diagram illustrating an image sensor according to example embodiments.

FIG. 9 is a block diagram illustrating an image sensor according to example embodiments.

Referring to FIG. 9, an image sensor 200 according to example embodiments may include a pixel array 210 and a controller for driving the pixel array 210. The controller may include a row driver 220 and a readout circuit 230. The readout circuit 230 may include a plurality of comparators 231, a ramp voltage generator 232, and a DBS circuit 233. The readout circuit 230 may include a sensing circuit 235 for outputting a compensation signal and inputting the compensation signal to the ramp voltage generator 232. The sensing circuit 235 may include a replica circuit 236 and a digitizer 237.

The other elements of the pixel array 210 and the controller included in the image sensor 200 illustrated in FIG. 9 may operate similarly to those of the image sensor 100 illustrated in FIG. 2. The sensing circuit 235 may have the same structure as that of at least a portion of each of the comparators 231. As an example, the sensing circuit 235 may include a portion of the elements included in each of the comparators 231. In the image sensor 200 according to example embodiments, the sensing circuit 235 may include replica input transistors corresponding to input transistors connected to a first input terminal of each of the comparators 231.

As an example, the replica circuit 236 included in the sensing circuit 235 may detect a sensing signal to obtain a replica threshold voltage of the replica input transistor corresponding to the threshold voltage of the input transistor. The sensing signal may be input to the digitizer 237 and may be converted into a digital signal, and the replica threshold voltage obtained from the sensing signal may be input to the ramp voltage generator 232 in the form of a control signal for compensating for the ramp voltage. However, the process of inputting the control signal of the lamp voltage to the lamp voltage generator 232 is not limited thereto, and may be operated through a different procedure according to the configuration of the sensing circuit 235.

In the image sensor 200 according to example embodiments, operation of the sensing circuit 235 including the replica circuit 236 and the digitizer 237 may be performed at least once. For example, when the image sensor 200 is initially operated, the replica circuit 236 may collect a sensing signal and may transmit a control signal to the lamp voltage generator 232. However, the example embodiment thereof is not limited thereto, and the replica circuit 236 may collect a sensing signal in every at least one or more frames during the operation of the image sensor 200 and may transmit a control signal to the lamp voltage generator 232.

Figure 10A:
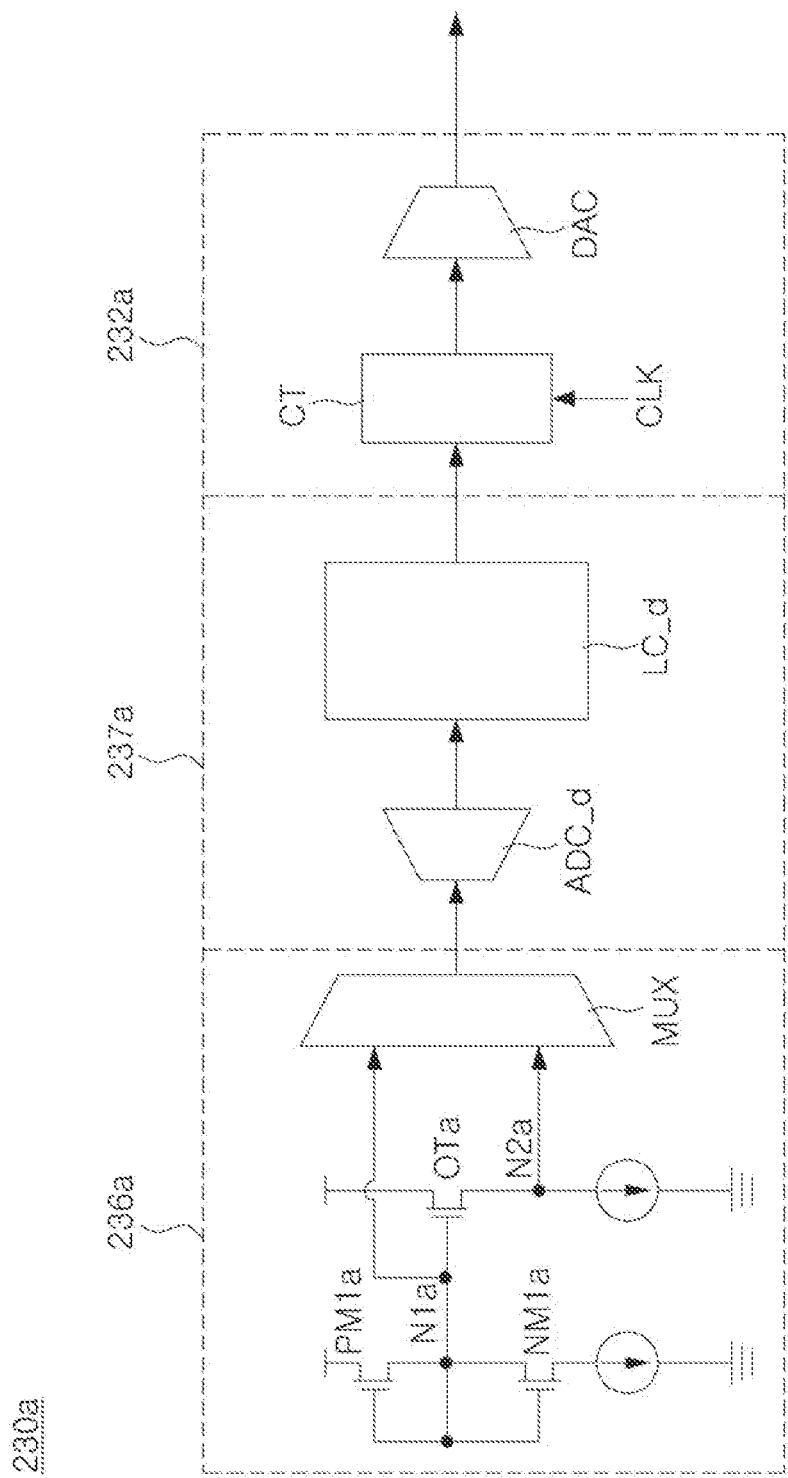
FIGS. 10A and 10B are circuit diagrams illustrating a replica circuit and a digitizer included in an image sensor according to example embodiments.
Figure 10B:
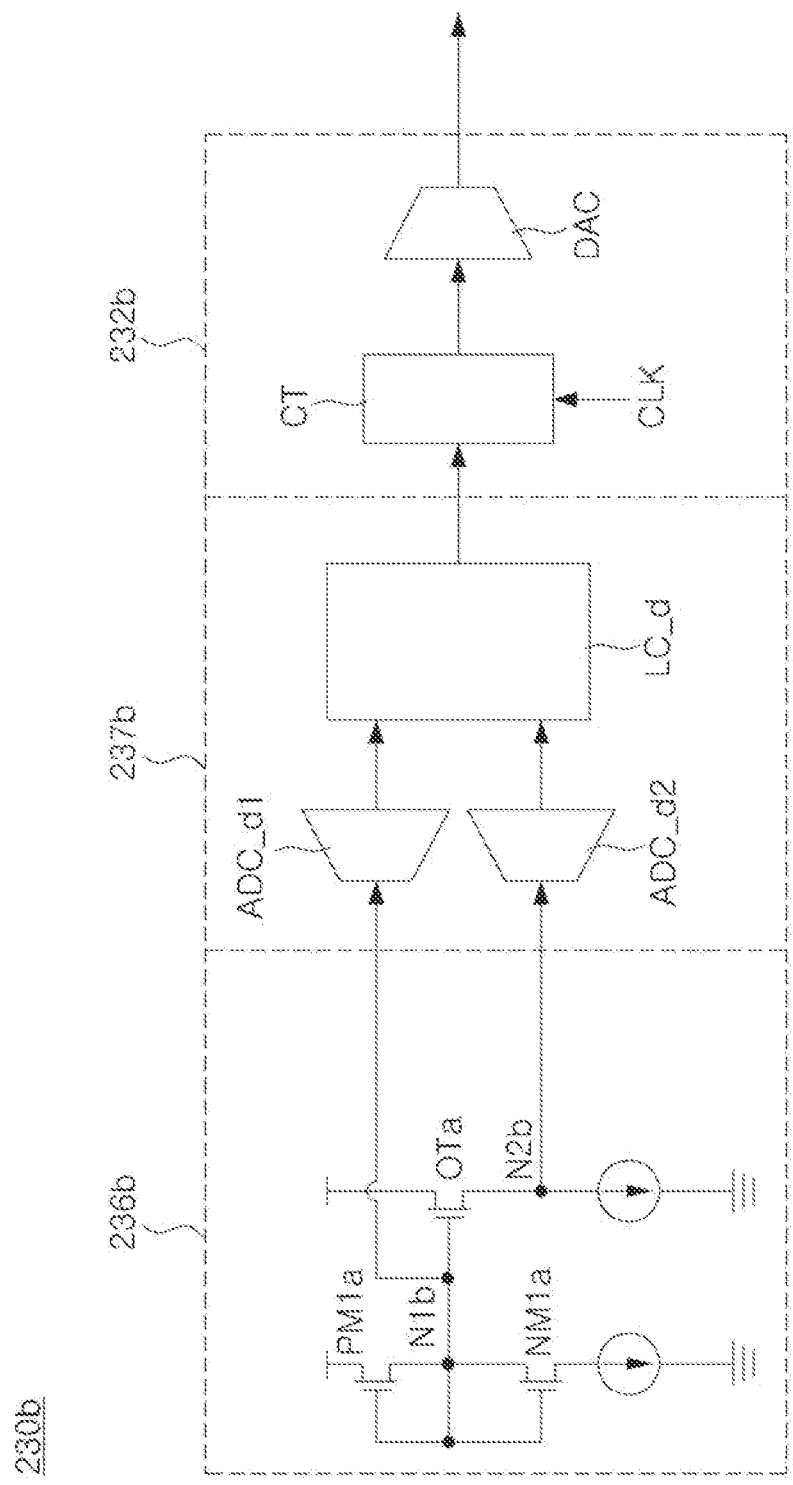

FIGS. 10A and 10B are circuit diagrams illustrating a replica circuit and a digitizer included in an image sensor according to example embodiments.

Referring to FIG. 10A, a readout circuit 230a included in the image sensor according to example embodiments may include a replica circuit 236a, a digitizer 237a, and a lamp voltage generator 232a. The replica circuit 236a may include elements the same as at least a portion of the elements included in each of the comparators.

As an example, referring back to the comparator (CDS) illustrated in FIG. 6, the replica circuit 236a may include a first replica NMOS transistor NM1a and a first replica PMOS transistor PM1a corresponding to first NMOS transistor NM1 and the first PMOS transistor PM1 included in the comparator CDS, respectively.

A node to which the first replica NMOS transistor NM1a and the first replica PMOS transistor PM1a are connected may correspond to the auto-zero node N1, and may be defined as a replica auto-zero node N1a. A voltage of the replica auto-zero node N1a may be a replica auto-zero voltage corresponding to the auto-zero voltage.

Likewise, a node connected to the output transistor OTa may correspond to the common node N2 and may be defined as a replica common node N2a. A voltage of the replica common node N2a may be a replica common node voltage corresponding to the common node voltage.

The replica circuit 236a may output the replica auto-zero voltage as a first sensing signal and may output the replica common node voltage as a second sensing signal.

In the image sensor according to example embodiments, the replica circuit 236a may further include a selection circuit (MUX) sequentially outputting the first sensing signal and the second sensing signal by a timing signal. For example, the selection circuit MUX may be implemented as a multiplexer. The digitizer 237a may include a single analog-to-digital converter ADC_d. The analog-to-digital converter ADC_d may receive the first sensing signal and the second sensing signal sequentially output from the replica circuit 236a and may convert the signals into a digital signal.

Referring to FIG. 10B, the readout circuit 230b included in the image sensor according to example embodiments may include a replica circuit 236b, a digitizer 237b, and a lamp voltage generator 232b. The replica circuit 236b may include elements the same as at least a portion of the elements included in each of the comparators. For example, the readout circuit 230b may have a structure similar to that of the readout circuit 230a described with reference to FIG. 10A.

In the image sensor according to example embodiments, the digitizer 237b may include two analog-to-digital converters ADC_d1 and ADC_d2. For example, the analog-to-digital converters ADC_d1 and ADC_d2 may receive a sensing signal from the replica circuit 236b. For example, the first analog-to-digital converter ADC_d1 may receive the voltage of the replica auto-zero node N1b as the first sensing signal, and the second analog-to-digital converter ADC_d2 may receive a voltage of the replica common node N2b as the second sensing signal. The received first sensing signal and second sensing signal may be converted into digital signals.

In FIGS. 10A and 10B, the digitizers 237a and 237b may further include a logic circuit LC_d. The logic circuit LC_d may detect a replica threshold voltage corresponding to the threshold voltage of the first NMOS transistor NM1 using the first sensing signal and the second sensing signal received from the replica circuits 236a and 236b. The logic circuit LC_d may further detect a margin voltage for operation of the image sensor along with the replica threshold voltage. The replica threshold voltage and/or the margin voltage may be input to the ramp voltage generator 232 in the form of a control signal for compensating for the ramp voltage.

The digitizers 237a and 237b may determine a compensation level of the ramp voltage. In an example embodiment, the compensation level may be determined according to the replica threshold voltage detected by the logic circuit LC_d. Also, alternatively, the compensation level may be determined in consideration of a margin voltage for operation of the image sensor together with the replica threshold voltage. As an example, the compensation level may correspond to a sum of a replica threshold voltage and a margin voltage for operation of the image sensor.

In the image sensor according to example embodiments, the digitizers 237a and 237b may output a control signal including information on the compensation level. The output control signal may be input to the ramp voltage generators 232a and 232b and may compensate for the ramp voltage.

In the image sensor according to example embodiments, the ramp voltage generators 232a and 232b may include a controller CT and a digital-to-analog converter DAC. The controller CT may receive a clock signal CLK and include a current cell array for determining the magnitude of the generated lamp voltage. A digital-to-analog converter (DAC) may convert a digital signal obtained from the current cell array into an analog signal to input the signal to the comparator.

The analog-to-digital converters ADC_d, ADC_d1, and ADC_d2 included in the digitizers 237a and 237b may have a resolution smaller than that of an analog-to-digital converter for converting an output signal of a comparator into a digital signal. For example, in the image sensor according to example embodiments, an analog-to-digital converter for converting an output signal of a comparator into a digital signal may be a DBS circuit.

As an example, the analog-to-digital converters ADC_d, ADC_d1, and ADC_d2 may have a resolution of 4 bits or 5 bits, and the DBS circuit may have a resolution of about 10 bits. In other words, the analog-to-digital converters ADC_d, ADC_d1, and ADC_d2 may output a 4bit or 5bit signal, and the DBS circuit may output a digital pixel signal of about 10bits. However, an example embodiment thereof is not limited, and the resolution of each device may be larger or smaller than the aforementioned example embodiment. The resolution of the analog-to-digital converters ADC_d, ADC_d1, and ADC_d2 may be determined by the magnitude of the compensation voltage, and the resolution of the DBS circuit may be determined by the generated ramp voltage, reset voltage, and pixel voltage.

Figure 11:
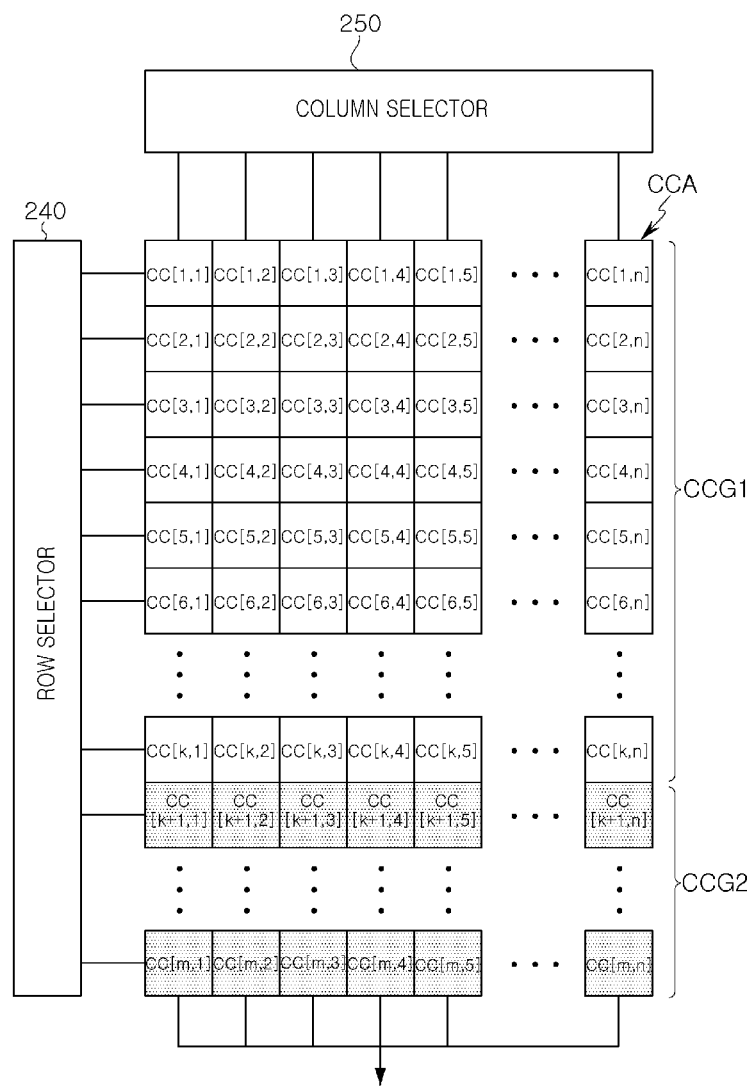
FIG. 11 is a diagram illustrating an operation of generating a ramp voltage performed by a ramp voltage generator included in an image sensor according to example embodiments.

FIG. 11 is a diagram illustrating an operation of generating a ramp voltage performed by a ramp voltage generator included in an image sensor according to example embodiments.

Referring to FIG. 11, the lamp voltage generator may include a current cell array CCA including a plurality of unit current cells CC[1,1] to CC[m,n], and may further include a row selector 240 and a column selector 250 for outputting a signal for driving the plurality of current cells CC[1,1] to CC[m,n].

The plurality of unit current cells CC[1,1] to CC[m,n] may be disposed at a point at which a row and a column intersect each other, and may be driven in order by the row selector 240 and the column selector 250. For example, while one of rows is activated by the row selector 240, the column selector 250 may drive the plurality of unit current cells CC[1,1] to CC[m,n] by sequentially activating or deactivating the columns. In the image sensor according to example embodiments, the lamp voltage generator may output a lamp voltage by driving a plurality of unit current cells CC[1,1] to CC[m,n].

However, an example embodiment thereof is not limited thereto, and the arrangement of the plurality of unit current cells included in the lamp voltage generator is not limited to the form of rows and columns, and may be driven in various manners. For example, a plurality of unit current cells may be grouped into a single group, and may be driven by a group unit.

In the image sensor according to example embodiments, a current cell array CCA included in the lamp voltage generator may include an x (n×m=x) number of unit current cells CC[1,1] to CC[m,n] in total. For example, the current cell array CCA may include 32 columns (n=32) and 48 rows (m=48) in total. Accordingly, the total number of unit current cells CC[1,1] to CC[m,n] may be 1536. However, an example embodiment thereof is not limited thereto, and the number of unit current cells CC[1,1] to CC[m,n] may be varied in example embodiments.

In the image sensor according to example embodiments, x number of unit current cells CC[1,1] to CC[m,n] may include a first current cell group CCG1 and a second current cell group CCG2. For example, the first current cell group CCG1 may include unit current cells CC[1,1] to CC[k,n] for generating a ramp voltage other than a compensation voltage. The second current cell group CCG2 may include unit current cells CC[k+1,1] to CC[m,n] for generating a compensation voltage. The unit current cells CC[1,1] to CC[k,n] included in the first current cell group CCG1 may be the unit current cells CC[1,1] to CC[k,n] from the first column to the k column, and the unit current cells CC[k+1,1] to CC[m,n]) included in the second current cell group CCG2 may be unit current cells CC[k+1,1]-CC[m,n] from the k+1 column to the m column. However, an example embodiment thereof is not limited thereto, and the current cell array CCA may include three or more current cell groups. Also, the unit current cells CC[1,1]-CC[m,n] included in each current cell group may be arranged in various manners.

The number of unit current cells CC[1,1] to CC[m,n] included in the first and second current cell groups CCG1 and CCG2 may be determined according to range of the output voltage and a voltage level output by a single unit current cell. The voltage level output by a single unit current cell may be related to how accurately the voltage to be output may be output. As an example, in the case of outputting an arbitrary voltage between 0 mV and 100 mV by 100 cells, the output voltage may be adjusted by unit of 1 mV. In the case of outputting an arbitrary voltage between 0 mV and 100 mV by 1000 cells, the output voltage may be adjusted by unit of 0.1 mV, such that the voltage to be output may be more accurately output.

Figure 12A:
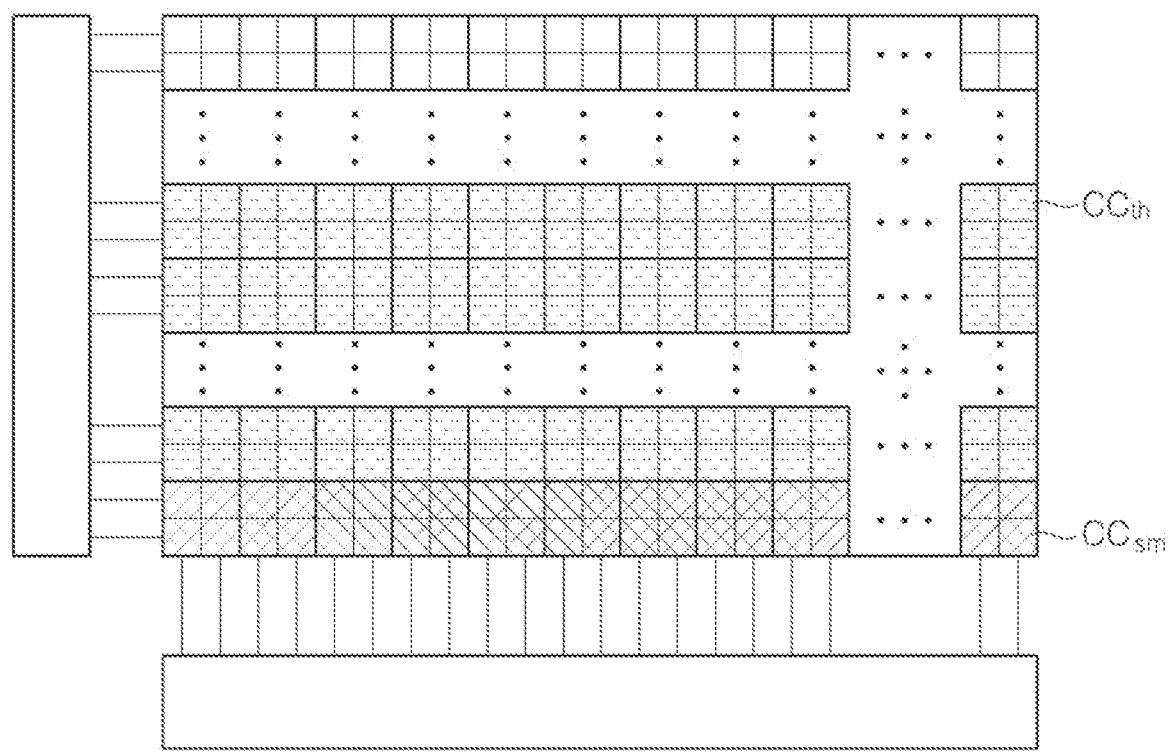
FIGS. 12A, 12B, 12C, 12D and 12E are diagrams illustrating a compensating operation in an image sensor according to example embodiments.
Figure 12B:
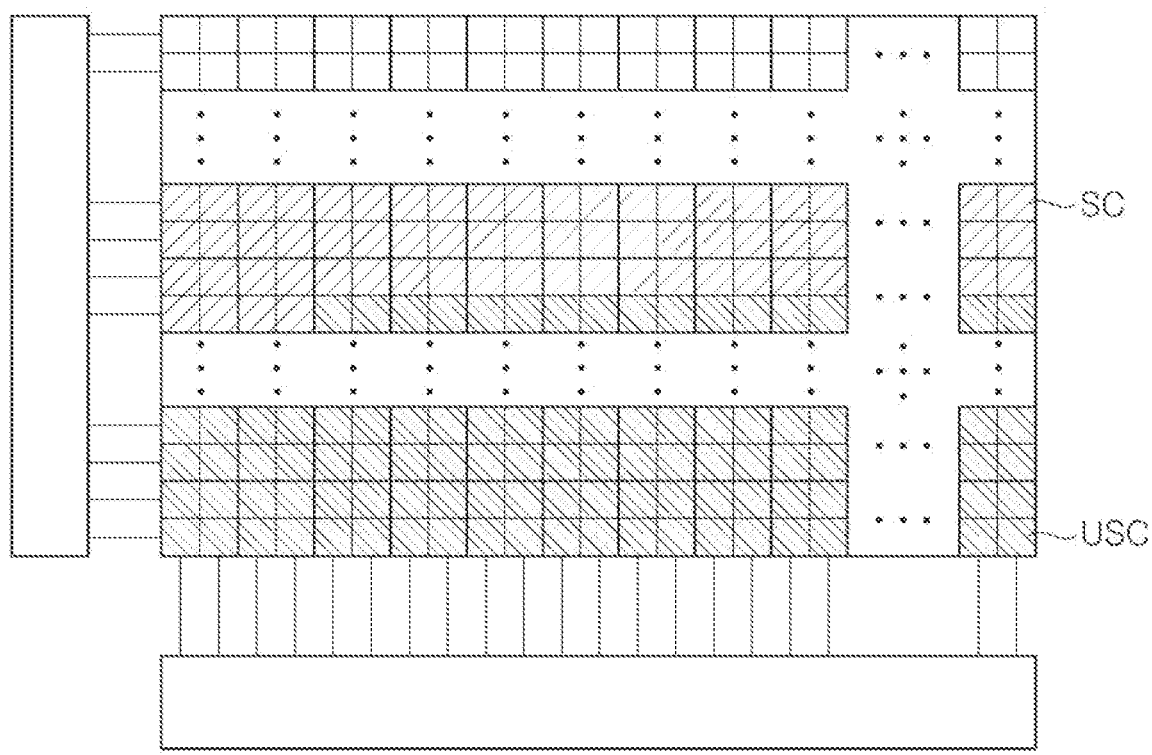
Figure 12C:
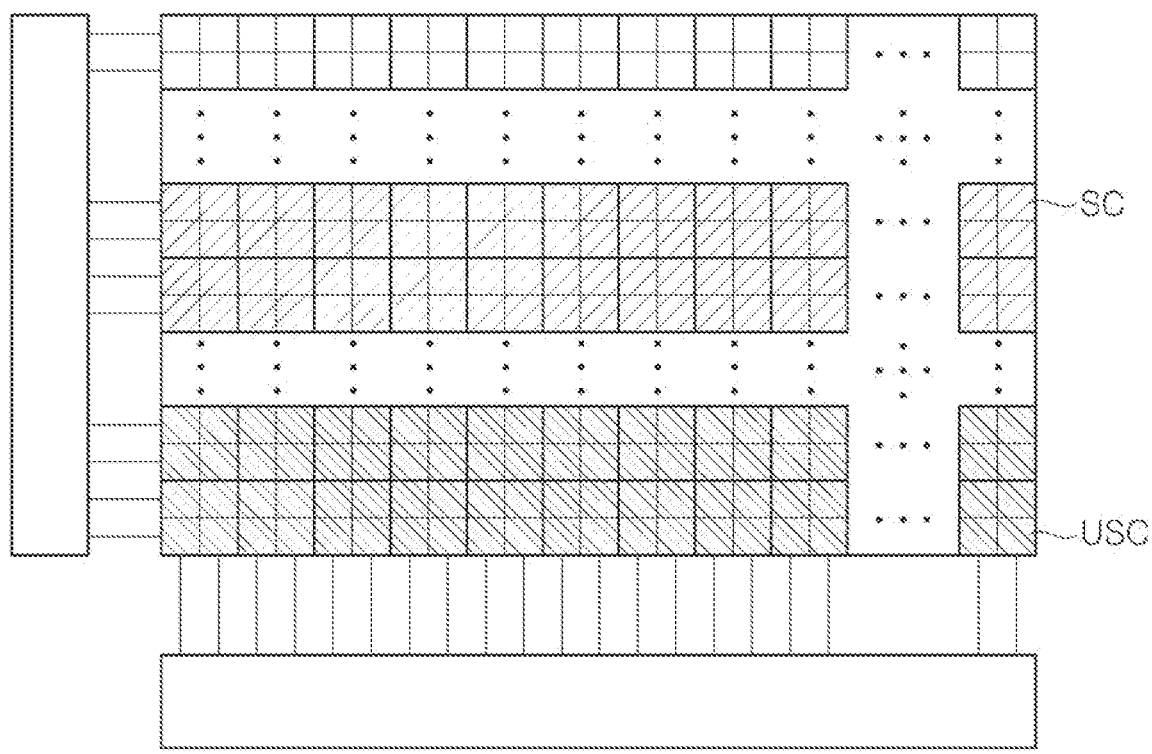
Figure 12D:
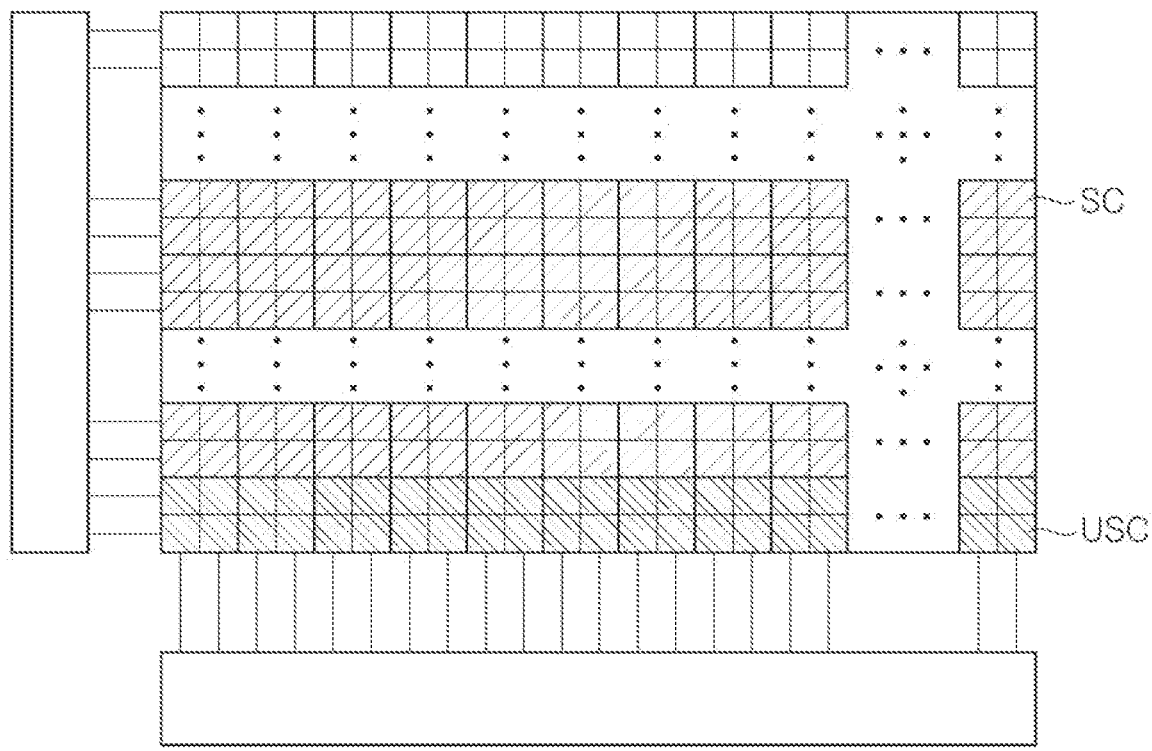
Figure 12E:
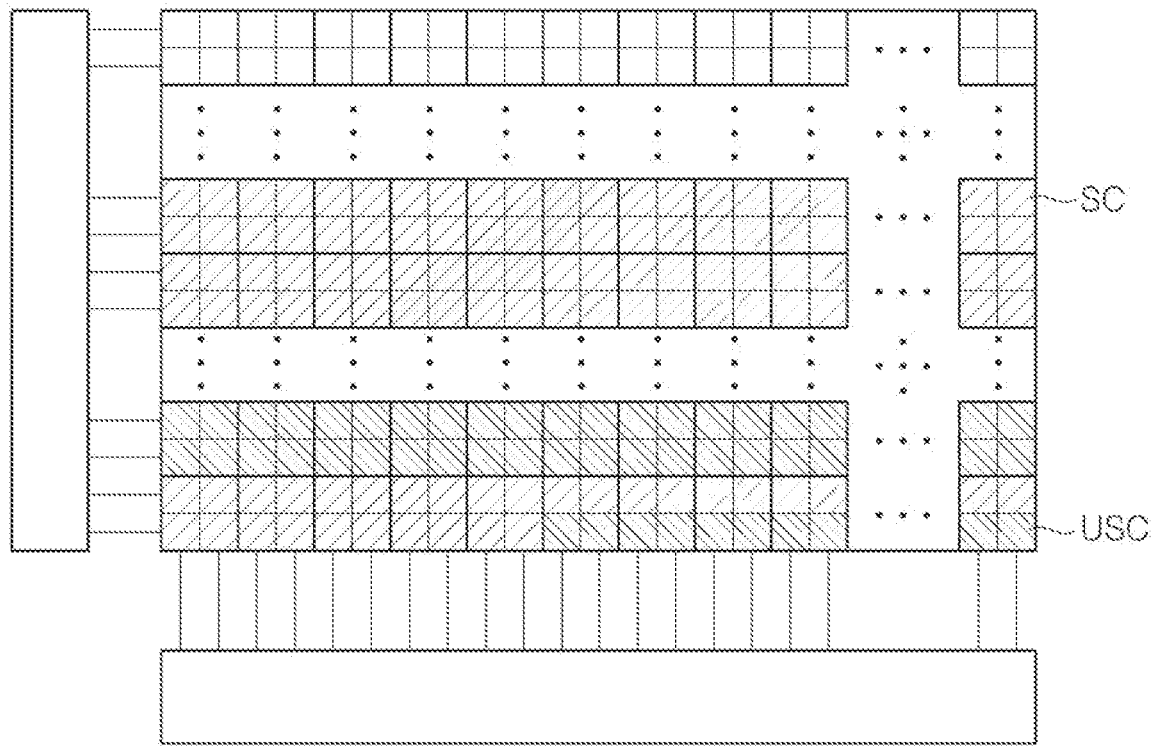

To describe the diagrams illustrated in FIGS. 11 to 12E, the voltage level output by a single unit current cell in the image sensor according to example embodiments may be assumed to be about 1 mV. However, an example embodiment thereof is not limited thereto, and the number of unit current cells and a level of voltage output by a single unit current cell may be varied in example embodiments.

As an example, when the ramp voltage other than the compensation voltage generated by the first current cell group CCG1 has a value between 0 mV and 1000 mV, the first current cell group CCG1 may include 1024 unit current cells CC[1,1] to CC[32,32] may be included. When the compensation voltage generated by the second current cell group CCG2 has a value between 0 mV and 500 mV, the second current cell group CCG2 may include 512 unit current cells CC[33,32] to CC [48,32]. However, an example embodiment thereof is not limited thereto, and the number of unit current cells included in each current cell group may be varied in example embodiments.

FIGS. 12A, 12B, 12C, 12D and 12E are diagrams illustrating a compensating operation in an image sensor according to example embodiments.

Referring to FIGS. 11 and 12A, the second current cell group CCG2 for generating a compensation voltage may include a plurality of threshold voltage current cells $CC_{th}$ and a plurality of margin voltage current cells $CC_{sm}$. In this case, the compensation voltage may include a replica threshold voltage corresponding to the threshold voltage of the input transistor of the comparator included in the image sensor according to example embodiments, and a margin voltage in consideration of distribution of the threshold voltage.

The plurality of threshold voltage current cells $CC_{th}$ may be defined as current cells for adding a compensation voltage corresponding to the replica threshold voltage. The plurality of margin voltage current cells $CC_{sm}$ may be defined as current cells for applying a compensation voltage corresponding to a margin voltage.

In the image sensor according to example embodiments, the lamp voltage generator may activate at least a portion of the plurality of threshold voltage current cells $CC_{th}$ to compensate for the lamp voltage. The ramp voltage generator may activate at least a portion of the plurality of margin voltage current cells $CC_{sm}$ along with at least a portion of the plurality of threshold voltage current cells $CC_{th}$.

As an example, the threshold voltage current cells CCth may be 16×32 unit current cells, and the margin voltage current cells $CC_{sm}$ may be 2×32 unit current cells. However, an example embodiment htereof is not limited thereto, and the numbers and shapes of the threshold voltage current cells $CC_{th}$ and the margin voltage current cells $CC_{sm}$ may be varied according to the magnitude of the compensation voltage.

Referring to FIG. 12B, in the image sensor in an example embodiment, the ramp voltage may be compensated by the threshold voltage of the input transistor without considering the margin voltage. The unit current cells may be activated by each cell unit. For example, the unit current cells may include activated cells SC and non-activated cells USC. As indicated by the current cells illustrated in FIG. 12B, the ramp voltage generator may generate a compensation voltage of about 100 mV using the activated unit current cells SC.

Referring to FIG. 12C, in the image sensor according to example embodiments, the ramp voltage may be compensated by the threshold voltage of the input transistor without considering the margin voltage. The unit current cells may be activated by row unit. For example, the unit current cells may include activated cells SC and non-activated cells USC. As indicated by the current cells illustrated in FIG. 12C, the ramp voltage generator may generate a compensation voltage of about 128 mV using the activated unit current cells SC.

Referring to FIG. 12D, in the image sensor according to example embodiments, the ramp voltage may be compensated by the threshold voltage of the input transistor without considering the margin voltage. For example, the unit current cells may include activated cells SC and non-activated cells USC. As indicated by the current cells illustrated in FIG. 12D, when all of the threshold voltage activation cells $CC_{th}$ are activated, a compensation voltage of about 512 mV may be generated.

Referring to FIG. 12E, in the image sensor according to example embodiments, a ramp voltage may be compensated by considering a margin voltage along with a threshold voltage of an input transistor. For example, the unit current cells may include activated cells SC and non-activated cells USC. The activated unit current cells SC may include at least a portion of the threshold voltage current cells $CC_{th}$ and at least a portion of the margin voltage current cells $CC_{sm}$. According to the current cells illustrated in FIG. 12E, the ramp voltage generator may generate a compensation voltage of about 170 mV using the activated unit current cells SC.

However, the example embodiments illustrated in FIGS. 12B to 12E are examples, and example embodiment thereof are limited thereto. The compensation voltage may be varied in example embodiments. Also, the arrangement of the activated cells SC may also be varied according to an operating method of the ramp voltage generator.

In the image sensor according to example embodiments, the generated compensation voltage may be added to the ramp voltage during an auto-zero operation. Because the compensation voltage is reflected to the two input terminals of the comparator together, the pixel voltage may increase by the compensation voltage as the ramp voltage. Accordingly, the input range of the pixel voltage in the comparator may be improved by the increased compensation voltage.

Figure 13:
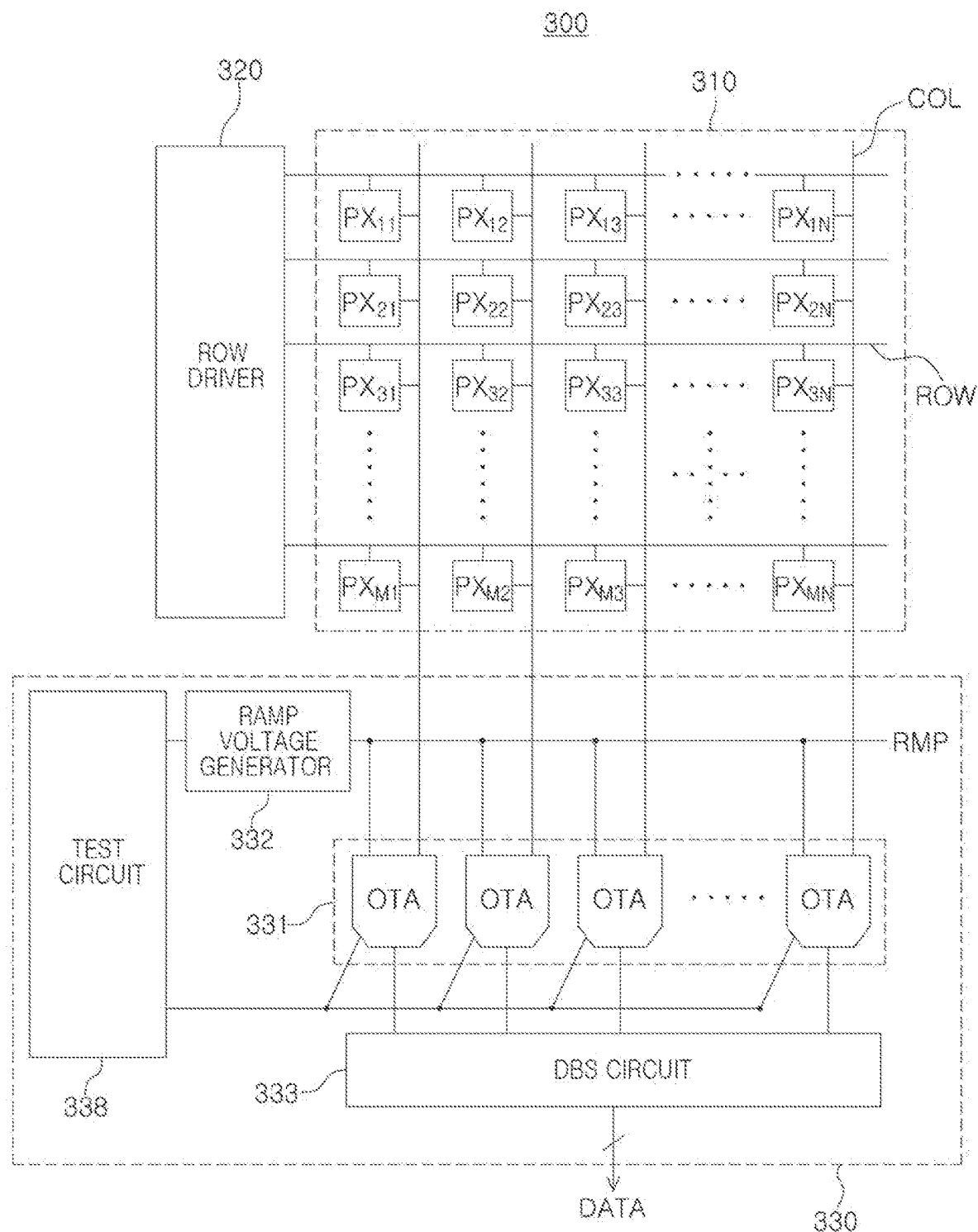
FIG. 13 is a block diagram illustrating an image sensor according to example embodiments.

FIG. 13 is a block diagram illustrating an image sensor according to example embodiments.

Referring to FIG. 13, an image sensor 300 according to example embodiments may include a pixel array 310 and a controller for driving the pixel array 310. The controller may include a row driver 320 and a readout circuit 330. The readout circuit 330 may include a plurality of comparators 331, a ramp voltage generator 332, and a DBS circuit 333. The readout circuit 330 may further include a sensing circuit for outputting a control signal and inputting the control signal to the lamp voltage generator 332. The sensing circuit may be configured as a test circuit 338.

The other elements of the pixel array 310 and the controller included in the image sensor 300 illustrated in FIG. 13 may operate similarly to those of the image sensor 100 illustrated in FIG. 2. The test circuit 338 may sense a threshold voltage of an input transistor of a plurality of transistors included in the comparator, connected to the first input terminal.

As an example, in the image sensor 300 according to example embodiments, the test circuit 338 may detect a threshold voltage by performing an electrical die sorting (EDS) test in a stage in which a wafer is completed in processes for manufacturing the image sensor 300. The detected threshold voltage may be input to the ramp voltage generator 332 in the form of a control signal for compensating the ramp voltage. However, the process of outputting a control signal of the lamp voltage from the test circuit 338 and inputting the signal to the lamp voltage generator 332 is not limited thereto, and may be operated in various manners according to the configuration of the test circuit 338.

Figure 14:
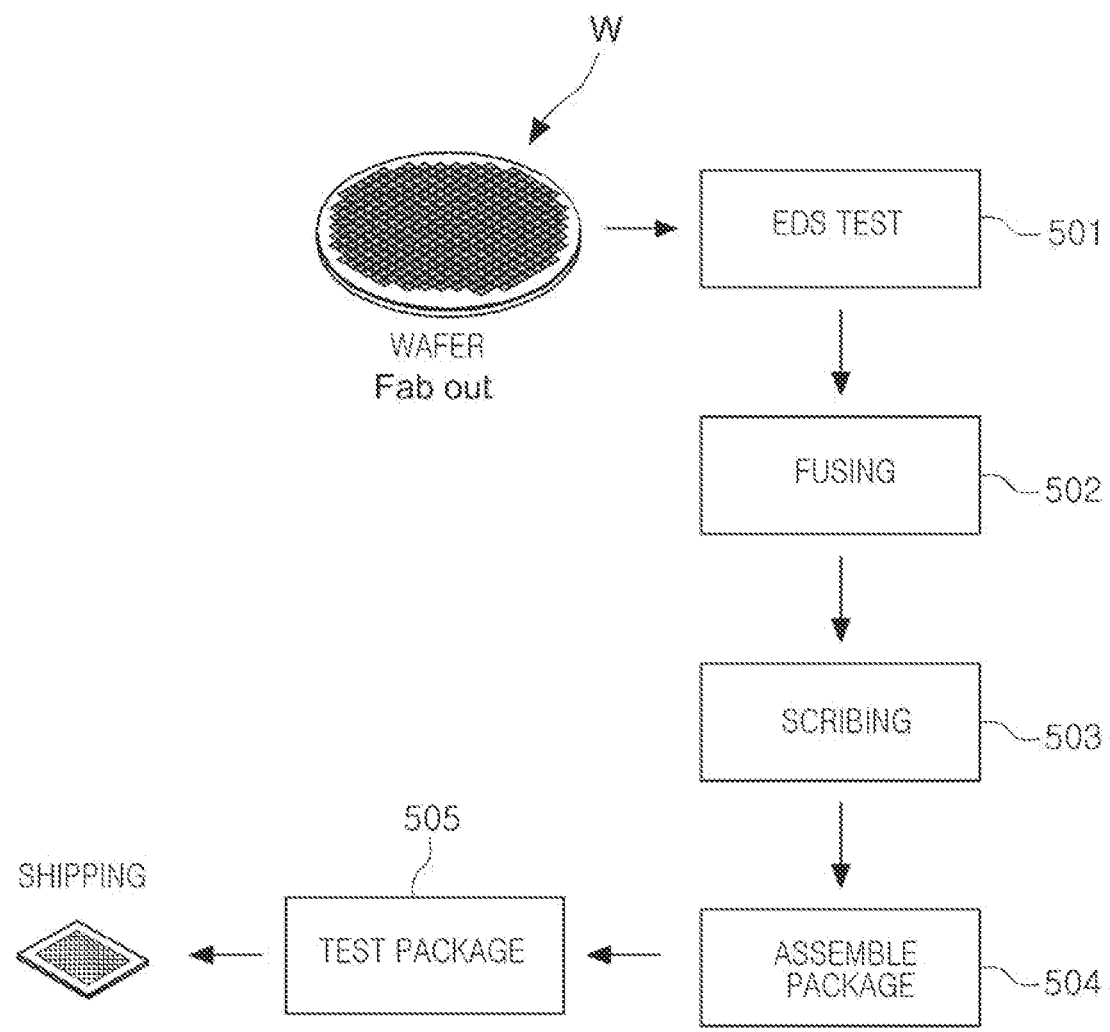
FIG. 14 is a block diagram illustrating an EDS test process of an example in which a test circuit is included in an image sensor according to example embodiments.

FIG. 14 is a block diagram illustrating an EDS test process of an example in which a test circuit is included in an image sensor according to example embodiments.

Referring to FIG. 14, when a plurality of semiconductor dies are produced by applying semiconductor processes to a wafer W, the wafer W may be fab-out. The plurality of semiconductor dies included in the wafer W may include a semiconductor device. The semiconductor device may be the image sensor described according to example embodimentss.

After the wafer (W) is fab-out, an EDS test 501 may be performed using a test circuit included in the image sensor according to example embodiments, such that the threshold voltage data of the input transistor included in the comparator may be detected. However, an example embodiment thereof is not limited thereto, and the EDS test 501 may be performed multiple times according to conditions such as temperature.

After the EDS test 501 is completed, fusing 502 may be performed to write information in a one time programmable (OTP) area. The fusing 502 may include writing a threshold voltage determined by the EDS test 501 in the OTP area.

Once the fusing 502 is completed, semiconductor dies including an image sensor may be separated by the wafer W by applying a scribing process 503, and a package assembly process 504 may also be applied. When the image sensor is produced as a package by the package assembly process 504, a package test 505 may be performed and a product may be shipped.

In a series of the processes described with reference to FIG. 14, a process of detecting a threshold voltage in an image sensor may be performed using OTP areas. In the image sensor according to example embodiments, the threshold voltage written through the above process may be transmitted to the lamp voltage generator in the form of a control signal and may be used to compensate for the lamp voltage.

Figure 15A:
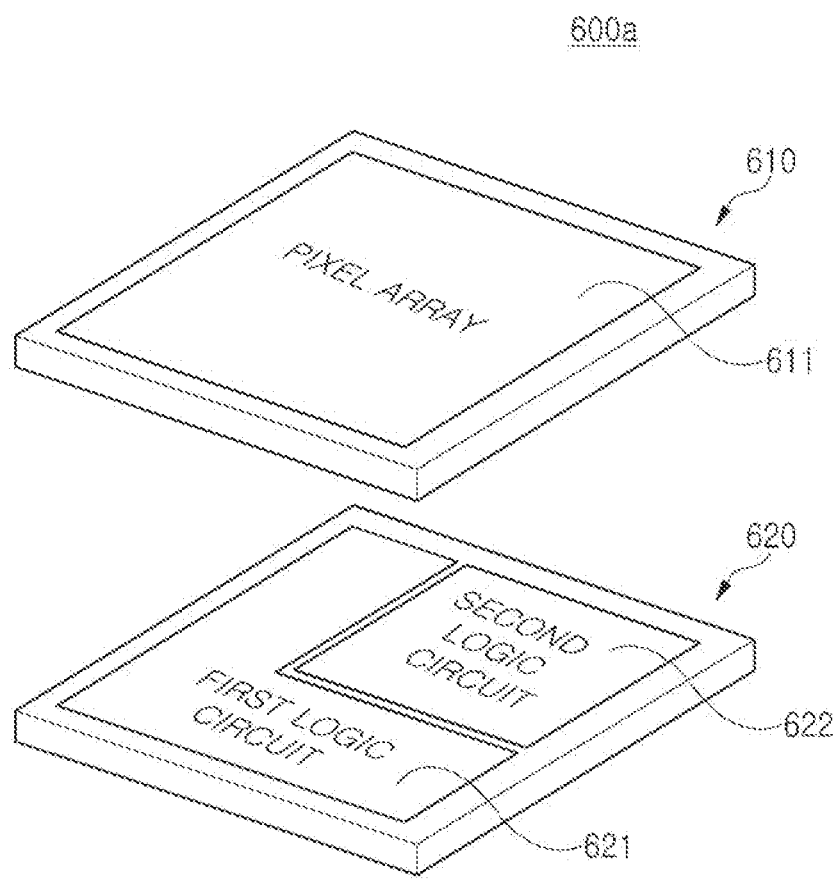
FIGS. 15A and 15B are diagrams illustrating an image sensor according to example embodiments.
Figure 15B:
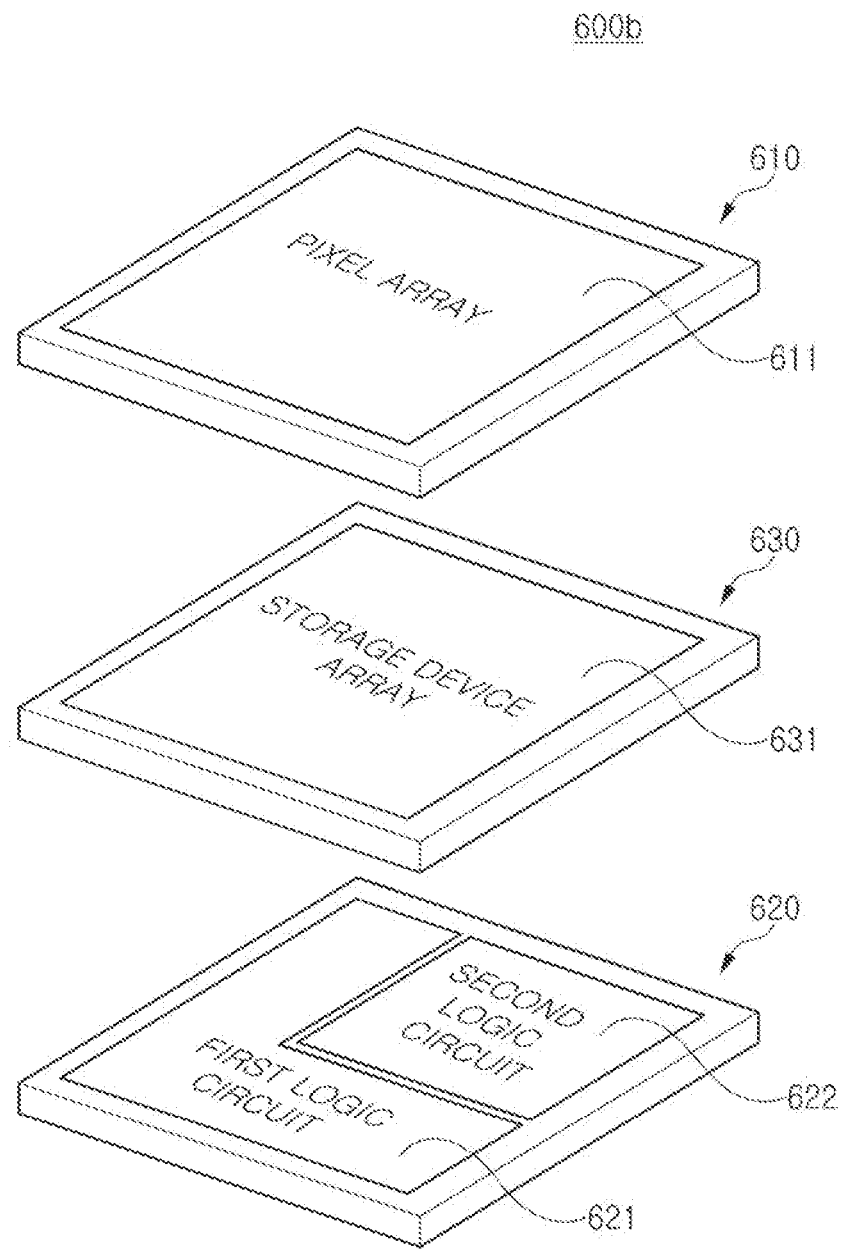

FIGS. 15A and 15B are diagrams illustrating an image sensor according to example embodiments.

Referring to FIG. 15A, an image sensor 600a according to example embodiments may include a first layer 610 and a second layer 620. The first layer 610 and the second layer 620 may be stacked in a vertical direction.

The first layer 610 may include a pixel array 611, and the second layer 620 may include logic circuits 621 and 622. The pixel array 611 may be connected to the logic circuits 621 and 622 through a plurality of row lines and a plurality of column lines.

As an example, the pixel array 611 may include general pixels and autofocusing pixels. The number of general pixels may be greater than the number of autofocusing pixels, and each of the autofocusing pixels may include a plurality of photodiodes. Also, when the D-cut lens is disposed on the front surface of the pixel array 611, the autofocusing pixels may include a first autofocusing pixel in which photodiodes are arranged in a direction of an edge of the D-cut lens, and a second autofocusing pixel in which photodiodes are arranged in a direction different from the direction of an edge of the D-cut lens. In a vertical direction in which the first layer 610 and the second layer 620 are stacked, the height of the first autofocusing pixel may be smaller than the height of the second autofocusing pixel.

The logic circuits 621 and 622 may include a first logic circuit 621 and a second logic circuit 622. The first logic circuit 621 may include a row driver, a readout circuit, a column driver, and a control logic for driving the pixel array 611. In the image sensor 600a according to example embodiments, the first logic circuit 621 may include a sensing circuit for sensing a replica threshold voltage corresponding to the threshold voltage of the input transistor of the comparator. The second logic circuit 622 may include a power circuit, an input/output interface, and an image signal processor. The area occupied by each of the first logic circuit 621 and the second logic circuit 622 and the arrangement form thereof may be varied.

Referring to FIG. 15B, the image sensor 600b may include a first layer 610, a second layer 620, and a third layer 630 disposed therebetween. The first layer 610 and the second layer 620 may be similar to the example embodiment described with reference to FIG. 15A. The third layer 630 may include a storage device array 631, and the storage device array 631 may include a storage device such as a metal-insulator-metal (MIM) capacitor, a charge trap device, a magnetic tunnel junction (MTJ) device, and a germanium (Ge)-antimony (Sb)-tellurium (Te) device (GST). The storage devices may be connected to any one or any combination of pixels and/or logic circuits 621 and 622 formed on the first layer 610.

The configuration of the image sensors 600a and 600b is not limited to the examples as illustrated in FIGS. 15A and 15B, and may be varied. As an example, a portion of the logic circuits 621 and 622, at least a portion of the first logic circuit 621, for example, may be disposed on the first layer 610 along with the pixel array 611.

Figure 16:
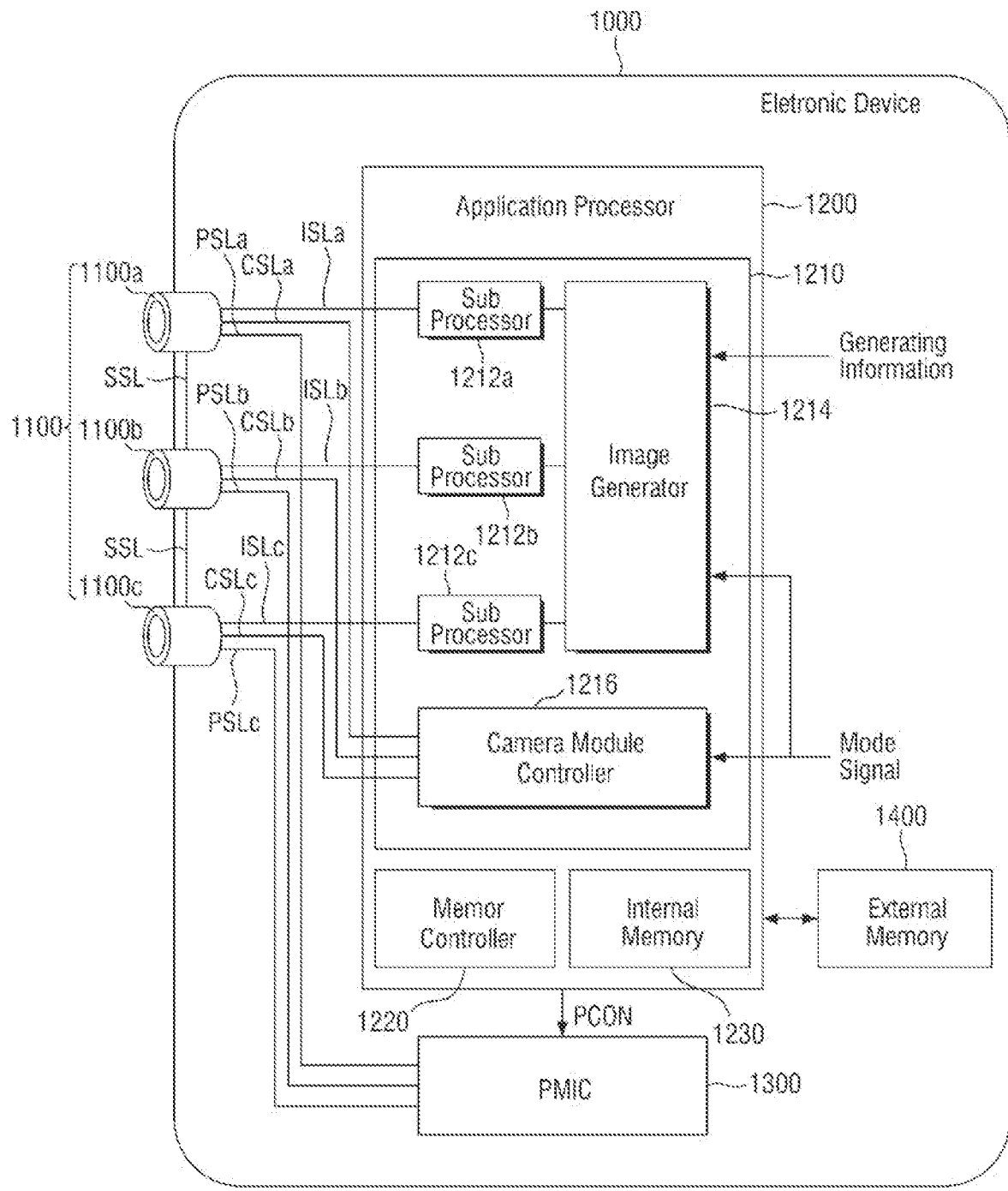
FIGS. 16 and 17 are diagrams illustrating an electronic device including an image sensor according to example embodiments.
Figure 17:
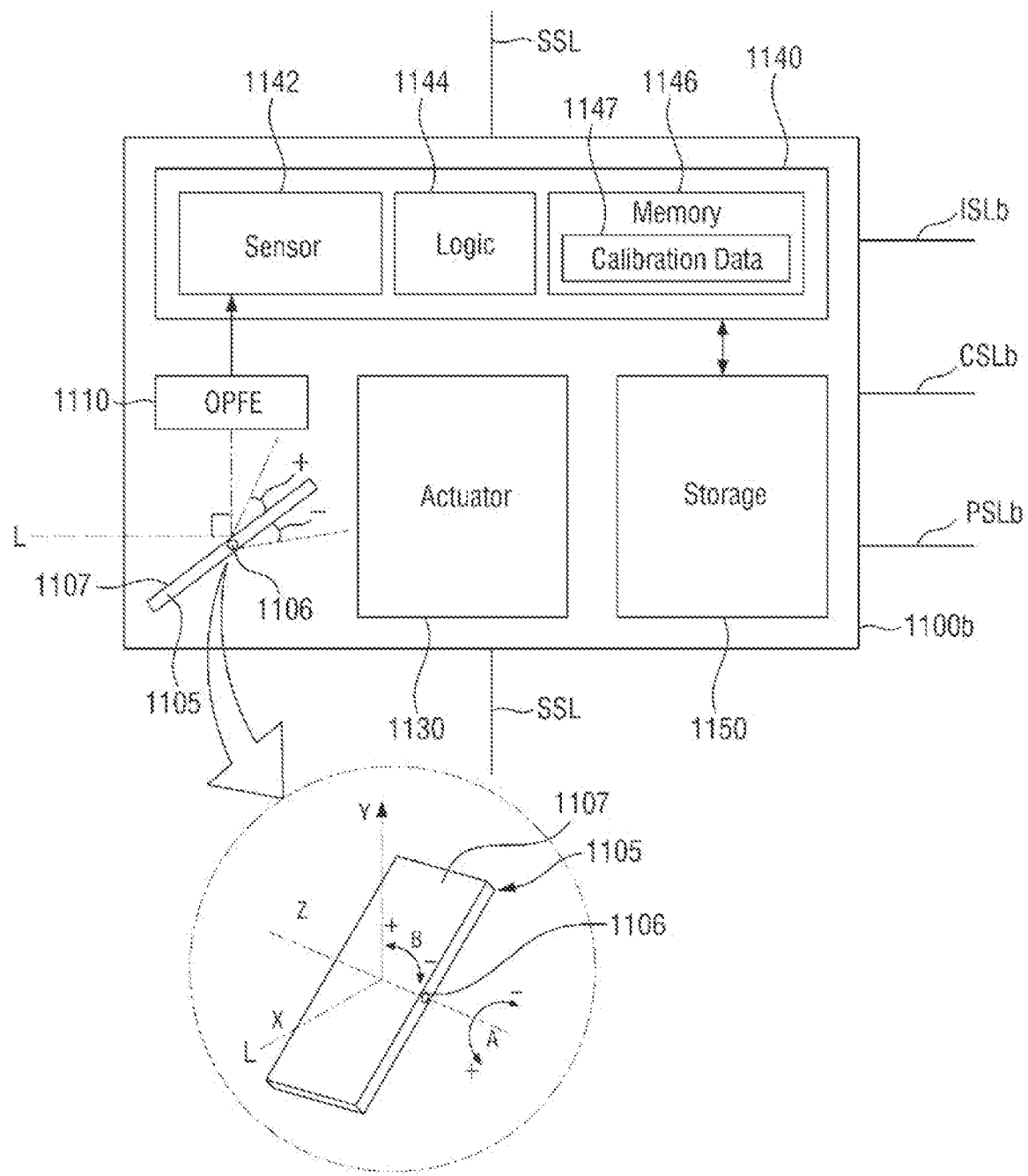

FIGS. 16 and 17 are diagrams illustrating an electronic device including an image sensor according to example embodiments.

Referring to FIG. 16, an electronic device 1000 may include a camera module group 1100, an application processor 1200, a power management integrated circuit (PMIC) 1300, and an external memory 1400.

The camera module group 1100 may include a plurality of camera modules 1100a, 1100b, and 1100c. The diagram illustrates an example embodiment in which three camera modules 1100a, 1100b, and 1100c are arranged, an example embodiment thereof is not limited thereto. In example embodiments, the camera module group 1100 may be modified to include only two camera modules. Also, in example embodiments, a camera module group 1100 may be modified to include n (where n is a natural number equal to or greater than 4) camera modules. Also, in an example embodiment, any one or any combination of the plurality of camera modules 1100a, 1100b, and 1100c included in the camera module group 1100 may include the image sensor described in one of the example embodiments with reference to FIGS. 1 to 15.

In the description below, a detailed configuration of the camera module 1100b will be described in greater detail with reference to FIG. 17, and the following description may also be applied to other camera modules 1100a and 1100b according to an example embodiment.

Referring to FIG. 17, a camera module 1100b may include a prism 1105, an optical path folding element (OPFE) 1110, an actuator 1130, an image sensing device 1140, and a storage unit 1150.

The prism 1105 may include a reflective surface 1107 formed of a light reflecting material and may change a path of light L incident from the outside.

In example embodiments, the prism 1105 may change the path of light L incident in the first direction X to the second direction Y perpendicular to the first direction X. Also, the prism 1105 may rotate the reflective surface 1107 formed of a light reflecting material in direction A around a central axis 1106, or may rotate the central axis 1106 in direction B, such that the path of light L incident in the first direction X may be changed to the vertical second direction, In this case, the OPFE 1110 may also move in the third direction Z perpendicular to the first direction X and the second direction Y.

In example embodiments, as illustrated in the diagrams, a maximum rotation of the prism 1105 angle in the A direction may be equal to or less than 15 degrees in the positive (+) A direction, and may be greater than 15 degrees in the negative (−) A direction. However, example embodiments thereof are not limited thereto.

In example embodiments, the prism 1105 may move by about 20 degrees, between 10 degrees and 20 degrees, or between 15 degrees and 20 degrees in the positive (+) or negative (−) B direction. The prism 1105 may move by the same angle in the positive (+) or negative (−) direction, or may move by a similar angle, differing by around one degree.

In example embodiments, the prism 1105 may move the reflective surface 1106 of the light reflecting material in a third direction (e.g., the Z direction) parallel to the extending direction of the central axis 1106.

The OPFE 1110 may include an optical lens consisting of a m (where m is a natural number) number of groups, for example. The m number of lenses may move in the second direction Y and may change the optical zoom ratio of the camera module 1100b. For example, when the basic optical zoom magnification of the camera module 1100b is Z, when the m optical lenses included in the OPFE 1110 move, the optical zoom magnification of the camera module 1100b may be changed to 3Z or 5Z or higher than 5Z.

The actuator 1130 may move the OPFE 1110 or an optical lens (hereinafter, referred to as an optical lens) to a position. For example, the actuator 1130 may adjust the position of the optical lens such that the image sensor 1142 may be disposed in a focal length of the optical lens for accurate sensing.

The image sensing device 1140 may include an image sensor 1142, a control logic 1144, and a memory 1146. The image sensor 1142 may sense an image of a sensing target using light L provided through an optical lens. The control logic 1144 may control the overall operation of the camera module 1100b. For example, the control logic 1144 may control the operation of the camera module 1100b according to a control signal provided through the control signal line CSLb.

The memory 1146 may store information for the operation of the camera module 1100b, such as calibration data 1147. The calibration data 1147 may include information for the camera module 1100b to generate image data using light L provided from the outside. The calibration data 1147 may include, for example, information on the degree of rotation described above, information on a focal length, information on an optical axis, and the like. When the camera module 1100b is implemented as a multi-state camera of which a focal length changes according to the position of the optical lens, the calibration data 1147 may include information related to the focal length value for each position (or each state) of the optical lens and autofocusing.

The storage unit 1150 may store image data sensed through the image sensor 1142. The storage unit 1150 may be disposed externally of the image sensing device 1140, and may be implemented in a form stacked with a sensor chip included in the image sensing device 1140. In example embodiments, the storage unit 1150 may be implemented as an electrically erasable programmable read-only memory (EEPROM), but example embodiments are not limited thereto.

Referring to FIGS. 16 and 17, in example embodiments, each of the plurality of camera modules 1100a, 1100b, and 1100c may include the actuator 1130. Accordingly, each of the plurality of camera modules 1100a, 1100b, and 1100c may include the same or different calibration data 1147 according to the operation of the actuator 1130 included therein.

In example embodiments, a camera module (e.g., 1100b) of the plurality of camera modules 1100a, 1100b, 1100c may be configured as a camera module having a folded lens shape that may include the prism 1105 and the OPFE 1110 described above, and the other camera modules (e.g., 1100a and 1100b) may be configured as a vertical type camera module that does not include the prism 1105 and OPFE 1110, but an example embodiment thereof is not limited thereto.

In example embodiments, a camera module (e.g., 1100c) of the plurality of camera modules 1100a, 1100b, and 1100c may be configured as a depth camera having a vertical shape, which extract depth information using infrared rays (IR), for example. In this case, the application processor 1200 may merge the image data provided from the depth camera with the image data provided from another camera module (for example, 1100a or 1100b) and may provide a 3D depth image.

In example embodiments, at least two camera modules (e.g., 1100a and 1100b) of the plurality of camera modules 1100a, 1100b, and 1100c may have different fields of view. In this case, for example, the optical lenses of at least two camera modules (e.g., 1100a and 1100b) of the plurality of camera modules 1100a, 1100b, and 1100c may be different from each other, but an example embodiment thereof is not limited thereto.

Further, in example embodiments, field of views of the plurality of camera modules 1100a, 1100b, and 1100c may be different. In this case, optical lenses included in the plurality of camera modules 1100a, 1100b, and 1100c may also be different from each other, but an example embodiment thereof is not limited thereto.

In example embodiments, the plurality of camera modules 1100a, 1100b, and 1100c may be physically separated from each other. That is, the sensing area of a single image sensor 1142 may not be divided into several areas for the plurality of camera modules 1100a, 1100b, and 1100c, but a dependent image sensor 1142 may be disposed in each of the plurality of camera modules 1100a, 1100b, and 1100c.

Referring back to FIG. 16, the application processor 1200 may include an image processing device 1210, a memory controller 1220, and an internal memory 1230. The application processor 1200 may be separated from the plurality of camera modules 1100a, 1100b, and 1100c. For example, the application processor 1200 and the plurality of camera modules 1100a, 1100b, and 1100c may be separated from each other as separate semiconductor chips.

The image processing device 1210 may include a plurality of sub-image processors 1212a, 1212b, and 1212c, an image generator 1214, and a camera module controller 1216.

The image processing device 1210 may include a plurality of sub-image processors 1212a, 1212b, and 1212c corresponding to the number of the plurality of camera modules 1100a, 1100b, and 1100c.

Image data generated from each of the camera modules 1100a, 1100b, and 1100c may be provided to the corresponding sub-image processors 1212a, 1212b, and 1212c through image signal lines ISLa, ISLb, and ISLc separated from each other. For example, image data generated by the camera module 1100a may be provided to the sub-image processor 1212a through an image signal line ISLa, the image data generated by the camera module 1100b may be provided to the sub-image processor 1212b through the image signal line ISLb, and image data generated by the camera module 1100c may be provided to the sub-image processor 1212c through the image signal line ISLc. the image data transmission may be performed using a camera serial interface (CSI) based on a mobile industry processor interface (MIPI), for example, but example embodiments are not limited thereto.

In example embodiments, a single sub-image processor may be arranged to correspond to a plurality of camera modules. For example, the sub image processor 1212a and the sub-image processor 1212c may not be separated from each other as illustrated in the diagram, but may be integrated with each other as a single sub-image processor, and the image data provided from the camera module 1100a and the camera module 1100c may be selected through a selection element (e.g., a multiplexer) and may be provided to the integrated sub-image processor.

Image data provided to each of the sub-image processors 1212a, 1212b, and 1212c may be provided to the image generator 1214. The image generator 1214 may generate an output image using the image data provided from each of the sub-image processors 1212a, 1212b, and 1212c according to image generation information or a mode signal.

For example, the image generator 1214 may merge at least a portion of the image data generated by the camera modules 1100a, 1100b, and 1100c having different fields of view according to the image generation information or the mode signal, thereby generating an output image. Also, the image generator 1214 may select one of image data generated by the camera modules 1100a, 1100b, and 1100c having different fields of view and may generate an output image.

In example embodiments, the image generation information may include a zoom signal or a zoom factor. Further, in example embodiments, the mode signal may be, for example, a signal based on a mode selected by a user.

When image generation information is a zoom signal (a zoom factor), and the camera modules 1100a, 1100b, 1100c have different observation fields of view, the image generator 1214 may perform different operations according to a type of a zoom signal. For example, when the zoom signal is the first signal, after the image data output by the camera module 1100a is merged with the image data output by the camera module 1100c, an output image may be generated using the merged image signal and the image data output by the camera module 1100b that has not be used in the merging. In the case in which the zoom signal is a second signal different from the first signal, the image generator 1214 does not perform the image data merging, and may generate an output image selecting one of the image data output by the camera module 1100a, 1100b, 1100c. However, example embodiments thereof are not limited thereto, and a method of processing image data may be varied if desired.

In example embodiments, the image generator 1214 may receive a plurality of image data having different exposure times from any one or any combination of the plurality of sub-image processors 1212a, 1212b, and 1212c, and may perform a high dynamic range (HDR) process on the plurality of image data, thereby generating merged image data having an increased dynamic range.

The camera module controller 1216 may provide a control signal to each of the camera modules 1100a, 1100b, and 1100c. The control signal generated by the camera module controller 1216 may be provided to the corresponding camera modules 1100a, 1100b, and 1100c through control signal lines CSLa, CSLb, and CSLc separated from each other.

One of the plurality of camera modules 1100a, 1100b, and 1100c may be designated as a master camera (e.g., 1100b) according to image generation information including a zoom signal or a mode signal, and the other camera modules (e.g., 1100a and 1100c) may be designated as a slave camera. Such information may be included in the control signal and may be provided to the corresponding camera modules 1100a, 1100b, and 1100c through the control signal lines CSLa, CSLb, and CSLc separated from each other.

A camera module operating as a master and a slave may be changed according to a zoom factor or an operation mode signal. For example, when a field of view of the camera module 1100a is wider than that of the camera module 1100b and the zoom factor has a low zoom magnification, the camera module 1100b may operate as a master, and the camera module 1100a may operate as a slave. When the zoom factor has a high zoom magnification, the camera module 1100a may operate as a master and the camera module 1100b may operate as a slave.

In example embodiments, a control signal provided from the camera module controller 1216 to each of the camera modules 1100a, 1100b, and 1100c may include a sync enable signal. For example, when the camera module 1100b is a master camera and the camera modules 1100a and 1100c are slave cameras, the camera module controller 1216 may transmit a sync enable signal to the camera module 1100b. The camera module 1100b receiving such a sync enable signal may generate a sync signal on the basis of the provided sync enable signal, and may provide the generated sync signal to the camera modules 1100a and 1100c through a sync signal line SSL. The camera module 1100b and the camera modules 1100a and 1100c may be synchronized with the sync signal and may transmit the image data to the application processor 1200.

In example embodiments, a control signal provided by the camera module controller 1216 to the plurality of camera modules 1100a, 1100b, and 1100c may include mode information according to the mode signal. The plurality of camera modules 1100a, 1100b, and 1100c may operate in a first operation mode and a second operation mode in relation to a sensing speed on the basis of the mode information.

The plurality of camera modules 1100a, 1100b, and 1100c may generate an image signal at a first rate (e.g., generating an image signal of a first frame rate) in the first operation mode, may encode (e.g., encoding an image signal of a second frame rate higher than a first frame rate) the image signal at a second rate, and may transmit the encoded image signal to the application processor 1200. In this case, the second rate may be 30 times or less the first rate.

The application processor 1200 may store the received image signal, an encoded image signal, in a memory 1230 provided therein or an external storage 1400 of the application processor 1200, and thereafter, the application processor 1200 may read out the encoded image signal from the memory 1230 or the storage 1400 and may display image data generated on the basis of the decoded image signal. For example, a corresponding sub-processor of the plurality of sub-processors 1212a, 1212b, and 1212c of the image processing device 1210 may perform the decoding, and may perform image processing for the decoded image signal.

The plurality of camera modules 1100a, 1100b, and 1100c may generate an image signal at a third rate lower than the first rate (e.g., generating a third frame rate lower than the first frame rate) in the second operation mode, and may transmit the image signal to the application processor 1200. The image signal provided to the application processor 1200 may have not been encoded. The application processor 1200 may perform image processing on the received image signal or may store the image signal in the memory 1230 or the storage 1400.

The PMIC 1300 may supply power, such as a power voltage, to each of the plurality of camera modules 1100a, 1100b, and 1100c. For example, the PMIC 1300 may supply first power to the camera module 1100a through a power signal line PSLa under control of the application processor 1200, may supply second power to the camera module 1100b through a power signal line PSLb, and may supply third poser to the camera module 1100c through a power signal line PSLc.

The PMIC 1300 may generate power corresponding to each of the plurality of camera modules 1100a, 1100b, 1100c in response to the power control signal PCON from the application processor 1200, and may also adjust a level of power. The power control signal PCON may include a power adjustment signal for each operation mode of the plurality of camera modules 1100a, 1100b, and 1100c. For example, the operation mode may include a low power mode, and in this case, the power control signal PCON may include information on a camera module operating in a low power mode and a determined power level. Levels of power provided to the plurality of camera modules 1100a, 1100b, and 1100c may be the same or different from each other. Also, the level of power may be dynamically changed.

According to the aforementioned example embodiment, the image sensor may obtain information corresponding to the threshold voltage of the input transistor included in the comparator using a replica circuit, and may transmit the information to the ramp voltage generator, thereby compensating for the ramp voltage input to the comparator. Accordingly, the input range of the comparator may be used regardless of the distribution and temperature of the process result value of the semiconductor chip in which the image sensor is integrated. Also, by lowering the power voltage for the operation of the image sensor, power consumption may be reduced.

While the example embodiments have been illustrated and described above, it will be apparent to those skilled in the art that modifications and variations could be made without departing from the scope of the disclosure as defined by the appended claims.

What is claimed is:

1. An image sensor comprising:
a pixel array comprising a plurality of pixels connected to row lines extending in a first direction and to column lines extending in a second direction intersecting the first direction;
a ramp voltage generator configured to output a ramp voltage;
a plurality of comparators, each of the plurality of comparators comprising:
a first input terminal to which the ramp voltage is input; and
a second input terminal connected to one of the column lines; and
a replica circuit comprising a same structure as a structure of a portion of the comparators,
wherein each of the comparators comprises:
a plurality of transistors;
a first auto-zero transistor connected to the first input terminal;
a second auto-zero transistor connected to the second input terminal; and
wirings connected to the plurality of transistors, the first auto-zero transistor, and the second auto-zero transistor,
wherein a gate terminal of the first auto-zero transistor is connected to a first wiring among the wirings, and
wherein a gate terminal of the second auto-zero transistor is connected to a second wiring different from the first wiring, among the wirings.

2. The image sensor of claim 1, wherein the first auto-zero transistor is turned off prior to the second auto-zero transistor being turned off, in an auto-zero operation.

3. The image sensor of claim 1, wherein the replica circuit is configured to sense a replica threshold voltage corresponding to a threshold voltage of an input transistor connected to the first input terminal, among the plurality of transistors.

4. The image sensor of claim 3, wherein the ramp voltage that is compensated using the sensed replica threshold voltage is input to the first input terminal of the comparator.

5. The image sensor of claim 3, wherein the replica threshold voltage is between 50 mV and 700 mV.

6. The image sensor of claim 3, wherein, after an auto-zero operation, an initial value of the ramp voltage is a sum of an auto-zero voltage and the sensed replica threshold voltage.

7. The image sensor of claim 3, wherein, after an auto-zero operation, an initial value of the ramp voltage is a sum of an auto-zero voltage, the sensed replica threshold voltage, and a margin voltage that is determined based on distribution of the threshold voltage of the input transistor.

8. An image sensor comprising:
a pixel array comprising a plurality of pixels;
a plurality of comparators, each of the plurality of comparators comprising a first input terminal, a second input terminal, a first auto-zero switch connected to the first input terminal, and a second auto-zero switch connected to the second input terminal;
a replica circuit comprising same devices as at least a portion of devices comprised in each of the plurality of comparators, and configured to output a sensing signal corresponding to an auto-zero voltage and a common node voltage of each of the plurality of comparators; and
a ramp voltage generator configured to compensate a ramp voltage based on the output sensing signal, and output the compensated ramp voltage to the first input terminal of each of the plurality of comparators,
wherein the sensing signal corresponds to a threshold voltage of an input transistor connected to the first input terminal of each of the plurality of comparators, and
wherein each of the plurality of comparators is configured to generate an output signal by comparing a pixel voltage and a reset voltage that are output from the pixel array, with the output ramp voltage.

9. The image sensor of claim 8, wherein the replica circuit further comprises a selection circuit configured to sequentially output a first sensing signal corresponding to the auto-zero voltage and a second sensing signal corresponding to the common node voltage.

10. The image sensor of claim 8, further comprising a digitizer configured to generate a control signal compensating for the ramp voltage, using the output sensing signal, and transmit the generated control signal to the ramp voltage generator.

11. The image sensor of claim 10, wherein the digitizer comprises a single analog-to-digital converter configured to sequentially receive, by a timing signal, from the replica circuit, a first sensing signal corresponding to the auto-zero voltage and a second sensing signal corresponding to the common node voltage.

12. The image sensor of claim 10, wherein the digitizer comprise two analog-to-digital converters configured to respectively receive, from the replica circuit, a first sensing signal corresponding to the auto-zero voltage and a second sensing signal corresponding to the common node voltage.

13. The image sensor of claim 10, wherein the digitizer comprises at least one analog-to-digital converter having a resolution smaller than a resolution of an analog-to-digital converter for converting the output signal of the comparator into a digital signal.

14. The image sensor of claim 10, wherein the digitizer comprises a logic circuit configured to determine a compensation level of the ramp voltage, based on the threshold voltage and a margin voltage for operation of the image sensor.

15. The image sensor of claim 10, wherein the replica circuit is further configured to, based on the image sensor being initially operated, collect the sensing signal, and transmit the generated control signal to the ramp voltage generator through the digitizer.

16. The image sensor of claim 10, wherein the replica circuit is further configured to collect the sensing signal in every one or more frames while the image sensor operates, and transmit the generated control signal to the ramp voltage generator through the digitizer.

17. The image sensor of claim 8, wherein each of the plurality of comparators is further configured to perform correlated double sampling to generate the output signal.

18. An image sensor comprising:
a pixel array comprising a plurality of pixels;
a ramp voltage generator configured to output a ramp voltage;
a plurality of comparators configured to generate an output signal by comparing a reset voltage and a pixel voltage that are output by the pixel array, with the output ramp voltage; and a sensing circuit configured to sense threshold voltages of input transistors comprised in the plurality of comparators, and output to the ramp voltage generator, a control signal for compensating the ramp voltage, wherein the ramp voltage is compensated based on the output control signal.

19. The image sensor of claim 18, wherein the sensing circuit comprises a replica circuit comprising replica input transistors corresponding to the input transistors comprised in the plurality of comparators, and wherein the sensing circuit is further configured to sense the threshold voltages by sensing replica threshold voltages of the replica input transistors.

20. The image sensor of claim 18, wherein the sensing circuit comprises a test circuit configured to sense the threshold voltages, and wherein the ramp voltage is compensated using the sensed threshold voltages.

* * * * *